United States Patent
Kwon

(10) Patent No.: US 11,191,115 B2
(45) Date of Patent: Nov. 30, 2021

(54) BLUETOOTH COMMUNICATION METHOD AND APPARATUS

(71) Applicant: LG ELECTRONICS INC., Seoul (KR)

(72) Inventor: Younghwan Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 337 days.

(21) Appl. No.: 16/480,200

(22) PCT Filed: Jan. 23, 2018

(86) PCT No.: PCT/KR2018/001006
§ 371 (c)(1),
(2) Date: Jul. 23, 2019

(87) PCT Pub. No.: WO2018/135926
PCT Pub. Date: Jul. 26, 2018

(65) Prior Publication Data
US 2019/0373653 A1 Dec. 5, 2019

Related U.S. Application Data

(60) Provisional application No. 62/449,121, filed on Jan. 23, 2017.

(51) Int. Cl.
*H04W 76/14* (2018.01)
*H04W 4/80* (2018.01)
(Continued)

(52) U.S. Cl.
CPC ............ *H04W 76/14* (2018.02); *H04W 4/80* (2018.02); *H04W 12/50* (2021.01); *H04W 56/001* (2013.01)

(58) Field of Classification Search
CPC ... H04W 76/14; H04W 56/001; H04W 12/50; H04W 4/80
See application file for complete search history.

(56) References Cited

U.S. PATENT DOCUMENTS

| | | | |
|---|---|---|---|
| 9,640,061 B1* | 5/2017 | Klimanis | ............ G08B 25/007 |
| 10,136,429 B2* | 11/2018 | Lee | ................... H04W 72/0446 |
| 2016/0278006 A1* | 9/2016 | Lee | ......................... H04W 4/80 |

FOREIGN PATENT DOCUMENTS

| | | | | |
|---|---|---|---|---|
| WO | WO 2015/069030 A1 | 5/2015 | | |
| WO | WO-2015068988 A1 * | 5/2015 | ............ | H04W 48/18 |

(Continued)

*Primary Examiner* — Mehmood B. Khan
(74) *Attorney, Agent, or Firm* — Birch, Stewart, Kolasch & Birch, LLP

(57) ABSTRACT

The present invention relates to a Bluetooth communication method. The Bluetooth communication method may comprise the steps of: performing a supported pairing feature procedure by a client; transmitting, to a first server, a first write request message requesting a writing of a control point attribute for indicating a periodic advertising operation, by the client; receiving, from the first server, a first write response message, in response to the first write request message, by the client; and receiving, from the first server, a first indication message for indicating whether to perform the periodic advertising operation, by the client. In this case, information associated with the periodic advertising operation may include at least one of periodic advertising mode information indicating that a periodic advertising mode is supported and periodic advertising synchronization procedure information indicating that a periodic advertising synchronization establishment procedure is supported.

14 Claims, 17 Drawing Sheets

(51) Int. Cl.
*H04W 56/00* (2009.01)
*H04W 12/50* (2021.01)

(56) References Cited

FOREIGN PATENT DOCUMENTS

| | | |
|---|---|---|
| WO | WO 2015/163680 A1 | 10/2015 |
| WO | WO 2016/108646 A1 | 7/2016 |
| WO | WO 2016/122186 A1 | 8/2016 |
| WO | WO 2016/167541 A1 | 10/2016 |

* cited by examiner

Fig. 9

| Opcode Value | Procedure or Opcode | Requirement |
|---|---|---|
| 0x00 | Reservedfor Future Use | |
| 0x01 | BR/EDR Acceptor Control Procedure | M |
| 0x02 | BR/EDR Initiator Control Procedure | M |
| 0x03 | LE Peripheral Control Procedure | M |
| 0x04 | LE Central Control Procedure | M |
| 0x05 | Association Termination Procedure | M |
| 0x06 | Select Client List Bank Procedure | C.1 |
| 0x07 | Reset Client UUID Selection Policy Info Procedure | C.1 |
| 0x08 - 0x30 | Reserved for Future Use | |
| 0x31 | Confirm Value Indication Opcode | M |
| 0x32 | Confirm Value Relay Opcode | M |
| 0x33 | Control Point Response Indication Opcode | M |
| 0x34 | Abort Opcode | M |

Fig. 10

| Response Code | Definition | Description |
|---|---|---|
| 0x00 | Success | Server is successfully performed with its peer device. |
| 0x01 | Not Discovered | Server does not discover its peer device. |
| 0x02 | Not Authenticated | Server is not connected with its peer device. |
| 0x03 | Failed | Server is failed to operate the requested procedure. |
| 0x04 | Insufficient Resources | Server does not have enough resources to operate the requested procedure |
| 0x05 | Timeout | Server does not complete its operation during the timeout. |
| 0x06 | Unavailable Bank | Server does not change the current bank with the requested bank counter. |
| 0x07 | Address Not Resolved | Server does not resolve the Resolvable Private Address. |
| 0x08 | Undefined Bearer | Server does not support the undefined bearers. |
| 0x0A | Secure Connections Required | Server does not authenticate with Secure Connections Pairing. |
| 0x0B | Unavailable Address Type | Server does not support the requested Address type. |
| 0x0C | Unavailable Control Point Opcode | Server does not support the requested Control Point Opcode. |
| 0x0D | Unavailable Operations | Server does not support the requested Operation. |
| 0x0E | Unavailable Effective Time | Server does not support the value of the Effective Time field. |
| 0x0F | Not Finished | Server does not finish the previous procedure. |
| 0x10 | No Confirm Value | Server cannot generate its Confirm Value. |
| 0x11 | Aborted | Server aborts the requested procedure |
| 0x12-0xFF | | Reserved for Future Use |

Fig. 13

| Associations Status Info (2 bytes) | Bank counter (1 byte) | Total Banks Number (1 byte) | Associations Number (1 byte) |
|---|---|---|---|

(a) Header field

| Field | Flag | Reading Behavior Configuration | | Indication Behavior Configuration (adding) | | |
|---|---|---|---|---|---|---|
| Subfield | | Selected Association Type subfield | Association Number Subfield | Indicated Association Type | Maximum Indicated Association Number | Indicated Interval |
| Length | 1 byte | 2 bytes | 2 bytes | 1 byte | 1 byte | 4 bytes |

(b) Configuration feature

BLUETOOTH COMMUNICATION METHOD AND APPARATUS

CROSS REFERENCE TO RELATED APPLICATIONS

This application is the National Phase of PCT International Application No. PCT/KR2018/001006, filed on Jan. 23, 2018, which claims priority under 35 U.S.C. 119(e) to U.S. Provisional Application No. 62/449,121, filed on Jan. 23, 2017, all of which are hereby expressly incorporated by reference into the present application.

TECHNICAL FIELD

The present invention relates to a method and apparatus for controlling a device using Bluetooth, that is, a short-distance technology, in a wireless communication system and, more particularly, to a method and apparatus for controlling, by a client, a server using a Bluetooth technology.

BACKGROUND ART

Bluetooth is a short-range wireless technology standard that may wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

In this case, the user may discover a Bluetooth device according to a Bluetooth communication method intended to be used with the Bluetooth device using the Bluetooth device, and then perform a connection with the Bluetooth device.

The Bluetooth communication method may be divided into as a BR/EDR method and an LE method. The BR/EDR method may be called a Bluetooth Classic method. The Bluetooth Classic method includes a Bluetooth technology led from Bluetooth 1.0 and a Bluetooth technology using an enhanced data rate (EDR) supported by Bluetooth 2.0 or a subsequent version.

A BLE technology applied, starting from Bluetooth 4.0, may stably provide information of hundreds of kilobytes (KB) at low power consumption. Such a BLE technology allows devices to exchange information with each other using an attribute protocol. The BLE method may reduce energy consumption by reducing the overhead of a header and simplifying the operation.

Some of the Bluetooth devices do not have a display or a user interface. The complexity of a connection, management, control, and a disconnection between various Bluetooth devices and Bluetooth devices using similar technologies is increasing.

Bluetooth supports a high speed at a relatively low cost with relatively low power consumption. However, Bluetooth is appropriately used within a limited space because it has a maximum transmission distance of 100 m.

DISCLOSURE

Technical Problem

The present invention provides a method and apparatus for controlling a device using a Bluetooth technology.

Furthermore, the present invention provides a method and apparatus for controlling, by a client, a server so that the server performs a specific operation.

Furthermore, the present invention provides a method and apparatus for performing, by a server, a specific operation indicated during a set operation time or within a set operation time if an operation time for performing the specific operation is set by a client.

Furthermore, the present invention provides a method and apparatus for defining an error message according to each service if a server cannot perform a specific operation indicated by a client.

Technical objects to be achieved in this specification are not limited to the aforementioned object, and those skilled in the art to which the present invention pertains may evidently understand other technological objects from the following description.

Technical Solution

The present invention provides a method and apparatus for controlling, by a client, a server in Bluetooth.

A Bluetooth communication method according to an embodiment of the present invention includes performing, by a client, a supported pairing feature procedure, wherein the supported pairing feature procedure is used for the client to obtain supported feature information indicating an operation supported by a server, and the supported feature information including periodic advertising operation-related information, transmitting, by the client, a first write request message to request the writing of a control point feature for the indication of a periodic advertising operation to a first server, receiving, by the client, a first write response message which is a response to the first write request message from the first server, and receiving, by the client, a first indication message for indicating whether the periodic advertising operation has been performed from the first server. The periodic advertising operation-related information may include at least one of periodic advertising mode information indicating that a periodic advertising mode is supported or periodic advertising synchronization procedure information indicating that a periodic advertising synchronization establishment procedure is supported.

In an embodiment, the first write request message may include periodic advertising information indicating that the server needs to perform the periodic advertising mode or the periodic advertising synchronization establishment procedure.

In an embodiment, if a value of the periodic advertising information is a first value, the periodic advertising information may indicate that the first server needs to perform a periodic advertising mode without security. If a value of the periodic advertising information is a second value, the periodic advertising information may indicate that the first server needs to perform a periodic advertising mode with security. If a value of the periodic advertising information is a third value, the periodic advertising information may indicate that the first server needs to perform a periodic advertising synchronization establishment procedure without security. If a value of the periodic advertising information is a fourth value, the periodic advertising information may indicate that the first server needs to perform a periodic advertising synchronization establishment procedure with security.

In an embodiment, the first indication message may include group ID information or group key information for the periodic advertising operation.

In an embodiment, the method may further include transmitting, by the client, a second write request message to request the writing of a control point feature for the indication of a periodic advertising operation to a second server, receiving, by the client, a second write response message which is a response to the second write request message from the second server, and receiving, by the client, a second indication message for indicating whether the periodic advertising operation performed by the first server is successful from the second server.

In an embodiment, the supported feature information may include at least one of information indicating that 2M PHY is supported, information indicating that LE Coded PHY is supported, information indicating that an advertising extension is supported, information indicating preferred advertising, or information indicating a preferred PHY.

In an embodiment, the information indicating preferred advertising may indicate any one of legacy advertising or the advertising extension as preferred advertising. The information indicating a preferred PHY may indicate any one of the 2M PHY or the LE Coded PHY as a preferred PHY.

A Bluetooth communication device according to an embodiment of the present invention includes a communication unit for communicating with an outside in a wireless or wired manner, a memory for storing data, and a processor functionally connected to the communication unit. The processor may be configured to perform a supported pairing feature procedure, wherein the supported pairing feature procedure is used to obtain supported feature information indicating an operation supported by a server, and the supported feature information including periodic advertising operation-related information, transmit, to a first server, a first write request message to request the writing of a control point feature for the indication of a periodic advertising operation, receive, from the first server, a first write response message which is a response to the first write request message, and receive, from the first server, a first indication message for indicating whether the periodic advertising operation has been performed. The periodic advertising operation-related information may include at least one of periodic advertising mode information indicating that a periodic advertising mode is supported or periodic advertising synchronization procedure information indicating that a periodic advertising synchronization establishment procedure is supported.

In an embodiment, the first write request message may include periodic advertising information indicating that the server needs to perform the periodic advertising mode or the periodic advertising synchronization establishment procedure.

In an embodiment, if a value of the periodic advertising information is a first value, the periodic advertising information may indicate that the first server needs to perform a periodic advertising mode without security. If a value of the periodic advertising information is a second value, the periodic advertising information may indicate that the first server needs to perform a periodic advertising mode with security. If a value of the periodic advertising information is a third value, the periodic advertising information may indicate that the first server needs to perform a periodic advertising synchronization establishment procedure without security. If a value of the periodic advertising information is a fourth value, the periodic advertising information may indicate that the first server needs to perform a periodic advertising synchronization establishment procedure with security.

In an embodiment, the first indication message may include group ID information or group key information for the periodic advertising operation.

In an embodiment, the processor may be configured to transmit, by the client, a second write request message to request the writing of a control point feature for the indication of a periodic advertising operation to a second server, receive, by the client, a second write response message which is a response to the second write request message from the second server, and receive, by the client, a second indication message for indicating whether the periodic advertising operation performed by the first server is successful from the second server.

In an embodiment, the supported feature information may include at least one of information indicating that 2M PHY is supported, information indicating that LE Coded PHY is supported, information indicating that an advertising extension is supported, information indicating preferred advertising, or information indicating a preferred PHY.

In an embodiment, the information indicating preferred advertising may indicate any one of legacy advertising or the advertising extension as preferred advertising. The information indicating a preferred PHY may indicate any one of the 2M PHY or the LE Coded PHY as a preferred PHY.

Advantageous Effects

There is an effect in that a client can control the operation of a server device using a Bluetooth technology according to an embodiment of the present invention.

Furthermore, according to an embodiment of the present invention, a client may control a server to perform a periodic advertising operation. Furthermore, a server may provide a client with information on a new type of PHY or whether an advertising extension is supported.

Effects which may be obtained in this specification are not limited to the aforementioned effects, and various other effects may be evidently understood by those skilled in the art to which the present invention pertains from the following description.

DESCRIPTION OF DRAWINGS

The accompanying drawings, which are included herein as a part of detailed descriptions to help understanding the present invention, provide embodiments of the present invention and describe technical features of the present invention with detailed descriptions below.

FIG. 9 is a diagram showing an example of operation codes for indicating, by a client, an operation with respect to a server, which is proposed in this specification.

FIG. 10 is a diagram showing an example of an error code of a server, which is proposed in this specification.

FIG. 13 is a diagram showing an example of a data format and feature for transmitting/receiving association status information having a large size and/or related information through a specific feature, which is proposed in this specification.

MODE FOR INVENTION

The aforementioned objects, features and advantages of the present invention will become more apparent through the following detailed description with respect to the accompanying drawings. Hereinafter, the embodiments of the present invention will be described with reference to the accompanying drawings, in which like numbers refer to like elements throughout the specification. In describing the present invention, a detailed description of known techniques associated with the present invention unnecessarily obscure the gist of the present invention, it is determined that the detailed description thereof will be omitted.

Hereinafter, a terminal related to the present invention will be described in detail with reference to the accompanying drawings. In the following description, usage of suffixes such as 'module', 'part' or 'unit' used for referring to elements is given merely to facilitate explanation of the present invention, without having any significant meaning by itself.

Figure 1:
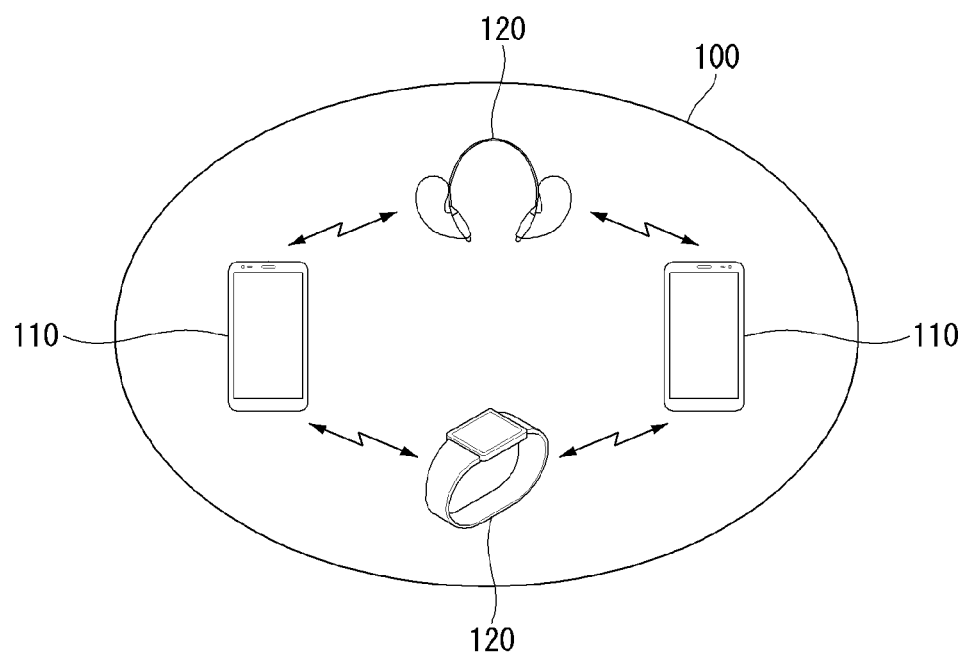
FIG. 1 is a schematic view illustrating an example of a wireless communication system using a Bluetooth low energy technology to which the present invention is applicable.

FIG. 1 is a schematic view illustrating an example of a wireless communication system using a Bluetooth low energy technology to which the present invention is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may also be called as data service device, slave device, slave, server, conductor, host device, gateway, sensing device, monitoring device, or the like.

The client device 110 may also be called as master device, master, client, member, sensor device, sink device, collector, third device, fourth device and the like.

The server device and the client device correspond to major components of the wireless communication system, and the wireless communication system may include components other than the server device and the client device.

The server device refers to a device which receives data from the client device and provides data to the client device in response when a corresponding request is received from the client device, through direct communication with the client device.

Also, in order to provide data information to the client device, the server device sends a notification message or an indication message to the client device in order to provide data information to the client device. Also, the server device receives a confirmation message corresponding to the indication message from the client device.

Also, in the process of transmitting and receiving notification, indication, and confirmation messages to and from the client device, the server device may provide data information to a user through a display unit or may receive a request input from the user through a user input interface.

Also, in the process of transmitting and receiving message to and from the client device, the server device may read data from a memory unit or may write new data to the corresponding memory unit.

Also, the single server device may be connected with a plurality of client devices, and may be easily re-connected with client devices using bonding information.

The client device 120 refers to a device which requests data information and data transmission from the server device.

The client device receives data through a notification message or an indication message from the server device, and when an indication message is received from the server device, the client device sends an acknowledgement message in response to the indication message.

Similarly, in the process of transmitting and receiving messages to and from the server device, the client device may also provide information to the user through a display unit or may receive an input from the user through a user input interface.

Also, in the process of transmitting and receiving messages with the server device, the client device may read data from a memory unit or may write new data to the corresponding memory unit.

Hardware components such as the display units, the user input interfaces, and the memory units of the server device and the client device will be described in detail with reference to FIG. 2.

Also, the wireless communication system may configure personal area networking (PAN) through the Bluetooth technology. For example, in the wireless communication system, a private piconet may be established between devices to quickly and safely exchange files, documents, and the like.

Figure 2:
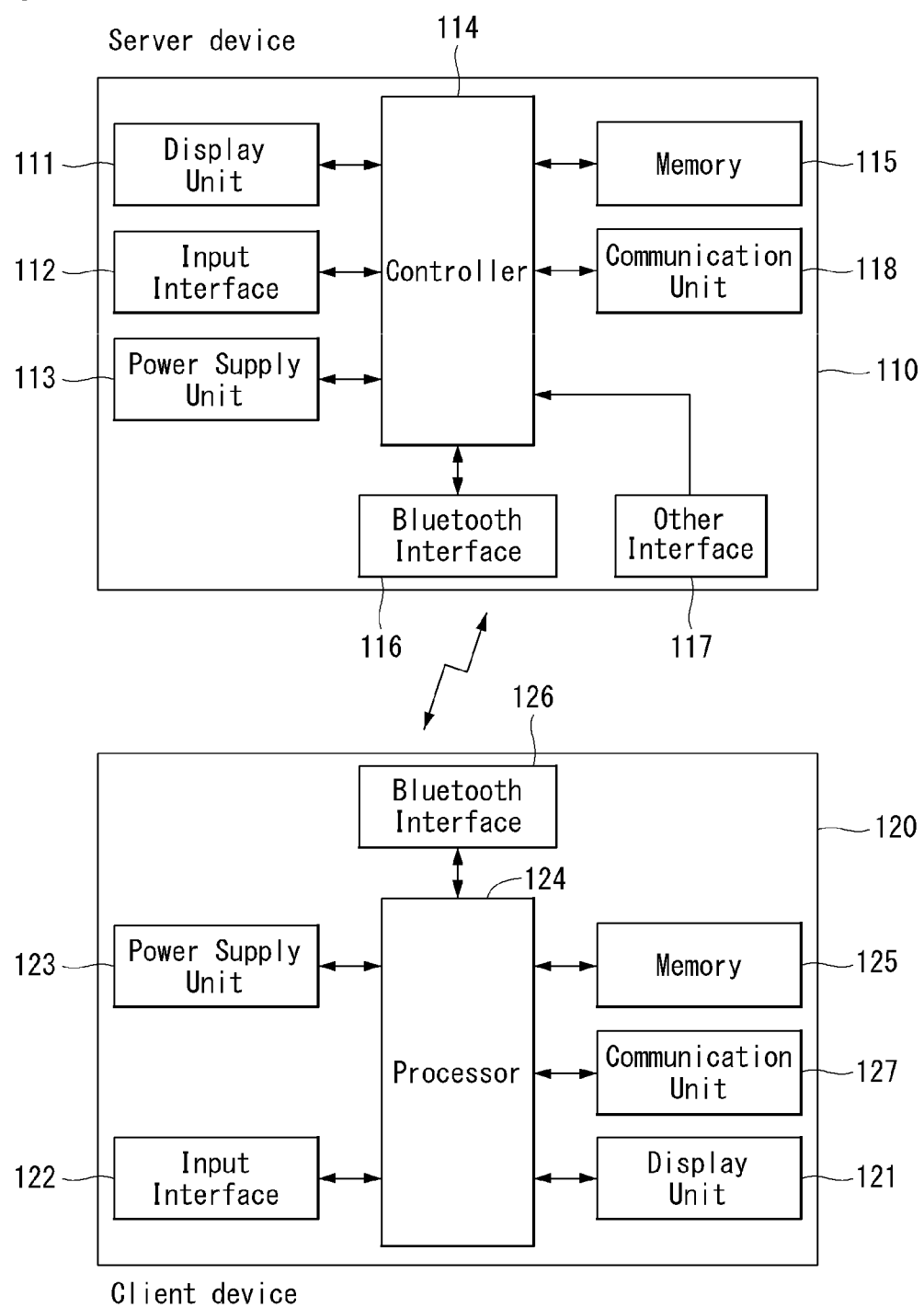
FIG. 2 illustrates one example of an internal block diagram of a device in which the methods proposed by the present specification may be implemented.

FIG. 2 illustrates one example of an internal block diagram of a device in which the methods proposed by the present specification may be implemented.

As illustrated in FIG. 2, a server device includes a display unit 111, a user input interface 112, a power supply unit 113, a processor 114, a memory unit 115, a Bluetooth interface 116, other interface 117, and a communication unit (or transceiver unit) 118.

The display unit 111, the user input interface 112, the power supply unit 113, the processor 114, the memory unit 115, the Bluetooth interface 116, other interface 117, and the communication unit 118 are functionally connected to each other to perform a method proposed in this disclosure.

Also, the client device includes a display unit 121, a user input interface 122, a power supply unit 123, a processor 124, a memory unit 125, a Bluetooth interface 126, and a communication unit (or transceiver unit) 128.

The display unit 121, the user input interface 122, the power supply unit 123, the processor 124, the memory unit 125, the Bluetooth interface 126, other interface 127, and the communication unit 128 are functionally connected to each other to perform a method proposed in this disclosure.

The Bluetooth interfaces 116 and 126 refer to units (or modules) able to transmit data such as a request/a response, a command, a notification, an indication/confirmation message between devices.

The memory units 115 and 126 are units implemented in various types of devices, in which various types of data are stored.

The processors 114 and 124 refer to modules controlling a general operation of the server device or the client device, which control requesting transmission of a message through the Bluetooth interface and other interface and processing a received message therethrough.

The processors 114 and 124 may also be termed a controller, a control unit, and the like.

The processors 114 and 124 may include an application-specific integrated circuit (ASIC), other chip set, a logic circuit and/or data processing unit.

The processors 114 and 124 control the communication units to receive an advertising message from the server device, control the communication unit to transmit a scan request message to the server device and receive a scan response message as a response to the scan request from the server device, and control the communication unit to transmit a connection request message to the server device in order to establish a Bluetooth connection with the server device.

Also, after the Bluetooth LE connection is established through the connection procedure, the processors 114 and 124 control the communication units to read or write data by using an attribute protocol from the server device The memory units 115 and 125 may include a read-only memory (ROM), a random access memory (RAM), a flash memory, a memory card, a storage medium and/or other storage device.

The communication units 118 and 127 may include a baseband circuit for processing a wireless signal. When an embodiment is implemented by software, the aforementioned technique may be implemented as a module (process, function, etc.) performing the aforementioned function. The module may be stored in a memory unit and may be executed by a processor.

The memory units 115 may be present within or outside of the processors 114 and 124, and may be connected to the processors 114 and 124 through various well-known units.

The display units 111 and 121 refer to modules providing status information of the devices, message exchange information, and the like, to the user through a screen.

The power supply units 113 and 123 refer to modules receiving external power or internal power and supplying power required for operations of the respective components under the control of the controllers.

As described above, BLE technology uses a small duty cycle and able to reduce power consumption considerably through a low speed data transmission rate.

The user input interfaces 112 and 122 refer to modules providing a user input such as a screen button to the controllers to enable the user to control an operation of the devices.

Figure 3:
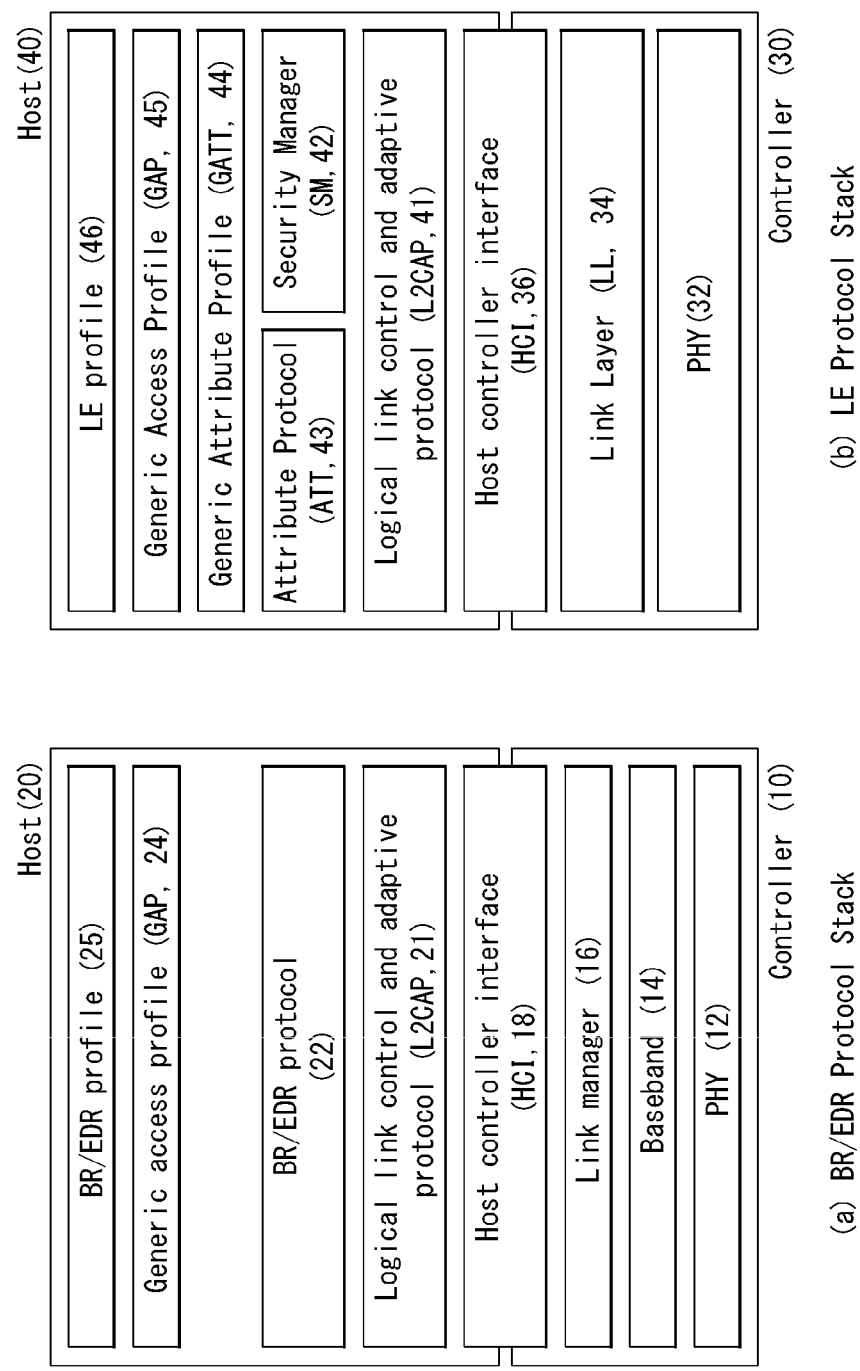
FIG. 3 illustrates one example of Bluetooth communication architecture to which the methods proposed by the present specification may be applied.

FIG. 3 illustrates one example of Bluetooth communication architecture to which the methods proposed by the present specification may be applied.

Referring to FIG. 3, FIG. 3(a) shows an example of a protocol stack of Bluetooth Basic Rate (BR)/Enhanced Data Rate (EDR), and FIG. 3(b) shows an example of a protocol stack of Bluetooth Low Energy (LE).

In detail, as illustrated in (a) of FIG. 3, the Bluetooth BR/EDR protocol stack may include an upper controller stack 10 and a lower host stack 20 with respect to a host controller interface (HCI) 18.

The host stack (or host module) 20 refers to hardware for transmitting or receiving a Bluetooth packet to and from a wireless transceiver module receiving a Bluetooth signal of 2.4 GHz, and is connected to a Bluetooth module, the controller stack 10, to control the Bluetooth module and performs an operation.

The controller stack 10 may include a PHY 12, link controller 14, and link manager 16.

The PHY 12 is a layer transmitting and receiving a 2.4 GHz radio signal, and when Gaussian Frequency Shift Keying (GFSK) modulation is used, the PHY layer 12 may transmit data by hopping 79 RF channels.

The link controller 14 plays the role of transmitting a digital signal, selects a channel sequence which hops 1400 times per second, and transmits a time slot having a length of 625 μs for each channel.

The Link Manager layer 16 controls overall operations (link setup, control and security) of a Bluetooth connection by utilizing Link Manager Protocol (LMP).

The link manager layer 16 may perform the following functions.

The link manager layer 16 may perform ACL/SCO logical transport, logical link setup, and control Detach: The link manager layer 16 stops connection and informs a counterpart device about the reason for stopping connection.

The link manager layer 16 performs power control and role switch.

The link manager layer 16 performs security (authentication, pairing, encryption) function.

The host controller interface layer 18 provides an interface between the host module and the controller module to allow the host to provide a command and data to the controller and allow the controller to provide an event and data to the host.

The host stack (or host module) 20 includes a logical link control and adaptive protocol (L2CAP) 21, an attribute protocol (ATT) 22, a generic attribute profile (GATT) 23, a generic access profile (GAP) 24, and a BR/EDR profile 25.

The logical link control and adaptive protocol (L2CAP) 21 may provide a two-way channels for transmitting data to a specific protocol or a profile.

The L2CAP 21 may multiplex various protocols and profiles provided from a Bluetooth higher position.

The L2CAP of the Bluetooth BR/EDR uses a dynamic channel, supports a protocol service multiplexer, retransmission, and a streaming mode, and provides segmentation and reassembly, per-channel flow control, and error control.

The generic attribute profile (GATT) 23 may operate as a protocol how the attribute protocol 22 is used in configuring services. For example, the generic attribute profile 23 may operate how ATT attributes are grouped together with services, and operate to describe features associated with services.

Thus, the GATT 23 and the ATT 22 may use features in order to describe status and services of a device and describe how the features are related and used.

The attribute protocol 22 and the BR/EDR profile 25 defines a service profile which uses the Bluetooth BR/EDR and an application protocol for exchanging data; and the Generic Access Profile (GAP) 24 defines device discovery, connection, and security level.

As shown in FIG. 3(b), the Bluetooth LE protocol stack includes a controller stack 30 which may be operated to process a wireless device interface for which timing is important and a host stack 40 which may be operated to process high level data.

First, the controller stack 30 may be implemented by using a communication module which may include a Bluetooth wireless device, for example, a processor module which may include a processing device such as a microprocessor.

The host stack may be implemented as part of the OS operating on the processor module or as an instantiation of a package on the OS.

In some examples, the controller stack and host stack may be operated or executed on the same processing device within the processor module.

The controller stack 30 includes a physical layer (PHY) 32, link layer 34, and host controller interface 36.

The PHY (wireless transceiver module) 32 is a layer which transmits and receives a 2.4 GHz radio signal and uses Gaussian Frequency Shift Keying (GFSK) modulation and a frequency hopping technique employing 40 RF channels.

The link layer 34, which performs the role of transmitting or receiving Bluetooth packets, performs an advertising and scanning function by using three advertising channels, generates a connection between devices, and provides a function of exchanging data packets of up to 257 bytes through 37 data channels.

The host stack may include a logical link control and adaptive protocol (L2CAP) 41, security manager (SM) 42, attribute protocol (ATT) 43, generic attribute profile (GATT) 44, generic access profile 45, and LE profile 46. However, the host stack 40 is not limited to the aforementioned description and may include various protocols and profiles.

The host stack multiplexes various protocols and profiles provided by upper Bluetooth layer by using the L2CAP.

First, the L2CAP may provide one bilateral channel for transmitting data to a specific protocol or profile.

The L2CAP 41 may operate to multiplex data among upper layer protocols, segment and reassemble packages, and manage multicast data transmission.

By default, Bluetooth LE uses three fixed channels (one for signaling channel, one for security manager, and one for attribute protocol). And depending on the needs, a dynamic channel may be used.

On the other hand, Basic Rate/Enhanced Data Rate (BR/EDR) uses a dynamic channel by default; and supports protocol service multiplexer, retransmission, and streaming mode.

The security manager (SM) 42 authenticates a device and manages the overall security of the Bluetooth LE as a protocol for providing key distribution.

The ATT 43 defines a rule for accessing data of a partner device in a server-client structure. ATT provides the following six message types (Request, Response, Command, Notification, Indication, and Confirmation).

① Request and Response message: Request message is a message for requesting and sending specific information from a client device to a server device, and Response message is a message responding to the Request message, which refers to a message transmitted from a server device to a client device.

② Command message: Command message is a message transmitted by a client device to a server device mainly to indicate a command for a specific operation, and the server device does not transmit a response to the command message to the client device.

③ Notification message: Notification message is a message transmitted by a server device to a client device to notify of an event, and the client device does not transmit a confirm message for the notification message to the server device.

④ Indication and confirm message: Indication and confirm message is a message transmitted by a server device to a client device to notify of an event, but differently from the notification message, the client device transmits a confirm message for the indication message to the server device.

The generic access profile 45 is a layer newly implemented for Bluetooth LE technology and is used to control role selection and multi-profile operation for communication among Bluetooth LE devices.

Also, the generic access profile 45 is mainly used for device discovery, connection establishment, and security process; defines a method for providing information to the user; and defines attribute types as follows.

① Service: A combination of behaviors related to data. Defines a basic operation of a device.

② Include: Defines a relationship between services

③ Characteristics: Data values used by a service

④ Behavior: A Universal Unique Identifier (UUID)-based format which may be read by a computer The LE profile 46 comprises GATT-dependent profiles and is mainly applied to Bluetooth LE devices. For example, the LE profile 46 may have Battery, Time, FineMe, and Proximity; and specifics of the GATT-based profiles are as follows.

Battery: Method for exchanging battery
Time: Method for exchanging time information
FindMe: Provides an alarm service according to distance
Proximity: Method for exchanging battery
Time: Method for exchanging time information The GATT 44 may be operated as a protocol which describes how the attribute protocol 43 is used when services are created. For example, the GATT 44 may be operated to define how attributes are grouped into services and operated to described characteristics related to the services.

Therefore, the GATT 44 and the ATT 43 describe status of a device and services and may use characteristics to describe in which way the characteristics are related to each other and how the characteristics are used.

In what follows, procedures of Bluetooth Low Energy (BLE) technology will be described briefly.

The BLE procedure may be divided into a device filtering procedure, advertising procedure, scanning procedure, discovering procedure, and connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

In this case, the advertising device refers to a device transmitting an advertisement event, that is, a device performing an advertisement, and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

An advertising device performs an advertising procedure to perform omnidirectional broadcasting to devices within coverage.

In this case, omnidirectional broadcasting refers to broadcasting in all directions rather than broadcasting in specific directions.

Differently from the above, directed broadcasting refers to broadcasting in specific directions. Directed broadcasting is performed without involving a connection procedure between an advertising device and a device in a listening status (hereinafter, it is called a listening device).

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertisement events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

The time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

Figure 4:
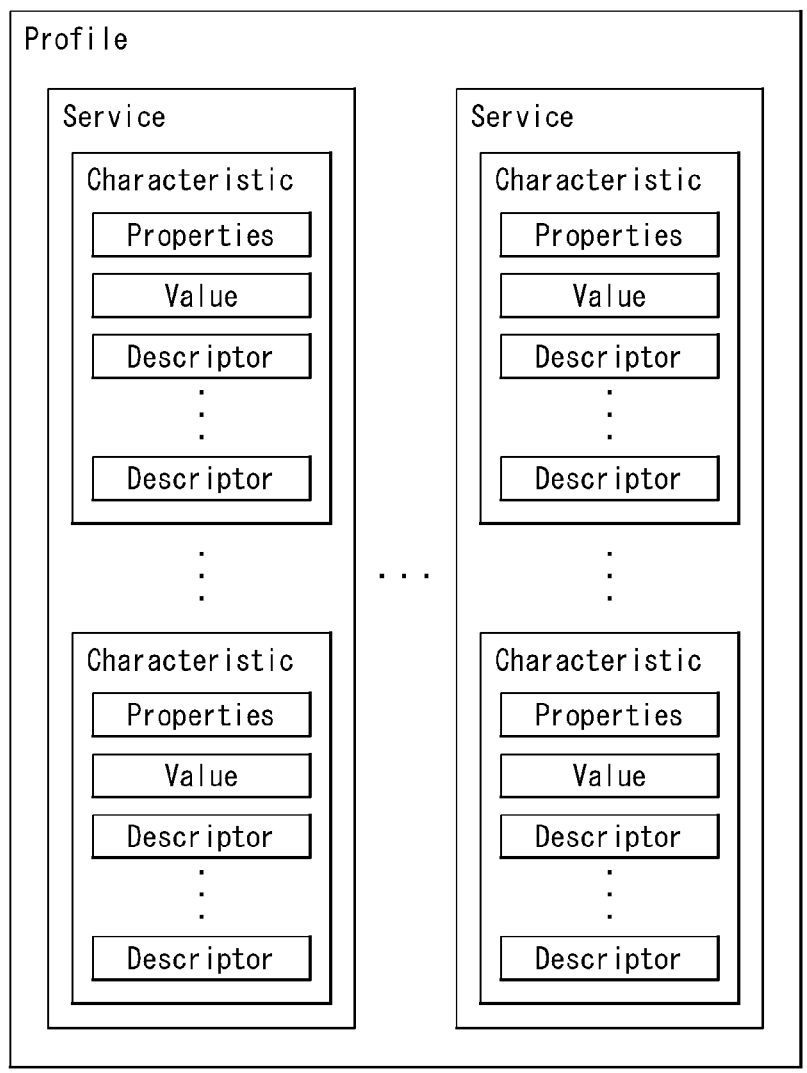
FIG. 4 illustrates one example of Generic Attribute Profile (GATT) structure of Bluetooth low energy technology.

FIG. 4 illustrates one example of Generic Attribute Profile (GATT) structure of Bluetooth low energy technology.

Referring to FIG. 4, a structure for exchanging profile data of Bluetooth Low Energy technology may be described.

More specifically, GATT defines a method for exchanging data by using service and characteristic between Bluetooth LE devices.

In general, a peripheral device (e.g., a sensor device) plays the role of a GATT server and provides a definition about a service and characteristic; and a central device plays the role of a GATT client.

In order to read or write data, a GATT client sends a data request to the GATT server, and every operation (transaction) is started by the GATT client and a response is received from the GATT server.

Figure 5:
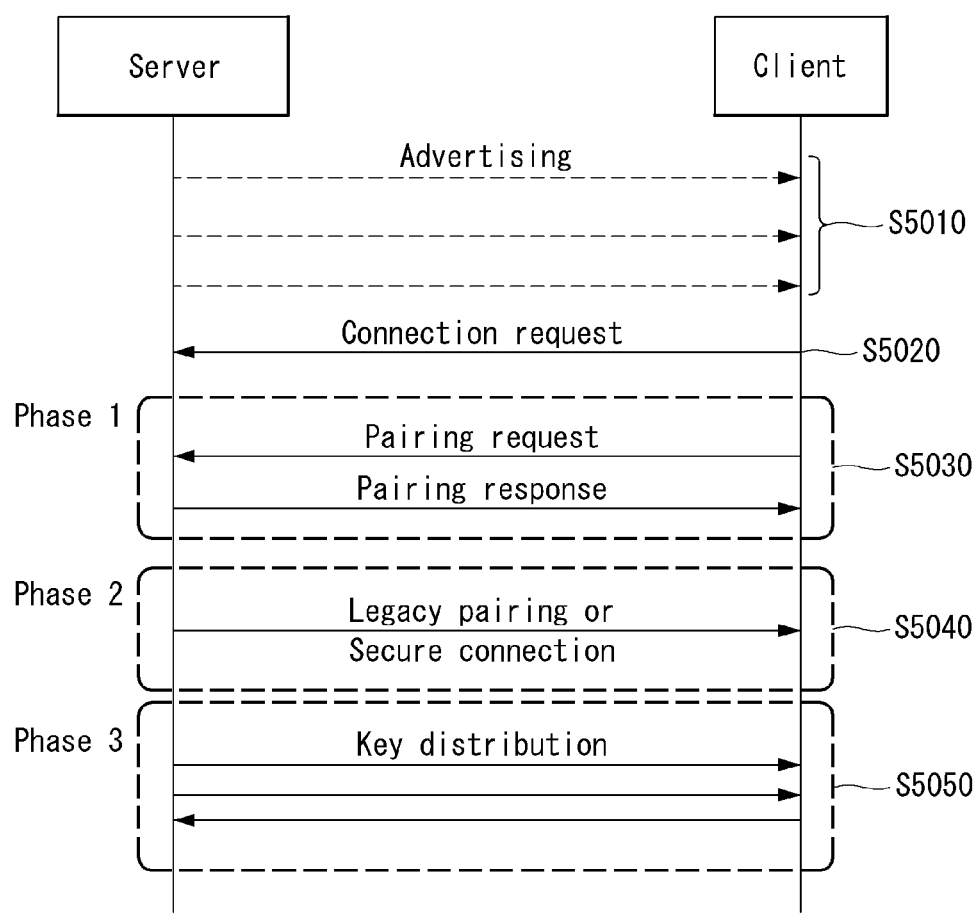
FIG. 5 is a flow diagram illustrating one example of a method for connection procedure using Bluetooth low energy technology to which the present invention may be applied.

A GATT-based operational structure used in the Bluetooth LE may be a vertical structure as illustrated in FIG. 5 on the basis of a profile, a service, and a characteristic.

The profile includes one or more services, and the services may include one or more characteristics or other services.

The service serves to divide data into logical units and may include one or more characteristics or other services, each of the services has a 16-bit or 128-bit identifier called a universal unique identifier (UUID)).

The characteristic is the lowermost unit in the GATT-based operational structure. The characteristic includes only one data, and has a 16-bit or 128-bit UUID, similar to the service.

The characteristic is defined by values of various types of information, and in order to hold each information, an attribute may be required for each information. The characteristic may use several continuous attributes.

The attribute has four components and has meanings as follows.

handle: Address of attribute
Type: Type of attribute
Value: Value of attribute
Permission: Right to access attribute FIG. 5 is a flow diagram illustrating one example of a method for connection procedure using Bluetooth low energy technology to which the present invention may be applied.

The server transmits an advertising message through three advertising channels at step S5010.

The server may be referred to as an advertiser before it is connected while it may be referred to as a master after it is connected. As one example of the server, a sensor (e.g., a temperature sensor) may be considered.

Also, the client may be referred to as a scanner before it is connected while it may be referred to as a slave after it is connected. As one example of the client, a smartphone may be considered.

As described above, Bluetooth performs communication by dividing 2.4 GHz band into a total of 40 channels. Three out of the 40 channels are advertising channels and are used to exchange packets transmitted and received to establish a connection, including various advertising packets.

The remaining 37 channels are used for data exchange after being connected as data channels.

After receiving the advertising message, the client may transmit a scan request message to the server to obtain additional data (e.g., a server device name).

In this case, the server transmits, to the client, a scan response message including additional data in response to the scan request message.

In this case, the scan request message and the scan response message are one type of the advertising packet, which may include only user data composed of 31 bytes or less.

Therefore, in the presence of data of which the size is 3 bytes but which has large overhead to be transmitted by establishing a connection, the data is transmitted twice by being divided into two smaller blocks via the scan request message/scan response message.

Next, the client transmits a connection request message for configuring a Bluetooth connection to the server at step S5020.

Through the operation above, a link layer (LL) connection is established between the server and the client.

Afterwards, the server and the client perform a security establishment procedure.

A security establishment procedure may be interpreted as secure simple pairing or performed by including the secure simple pairing.

In other words, the security establishment procedure may be performed through phases 1 to 3.

More specifically, a pairing procedure (phase 1) is performed between the server and the client at step S5030.

During the pairing procedure, the client transmits a pairing request message to the server, and the server transmits a pairing response message to the client.

Devices exchange information about authentication requirements, Input/Output (I/O) capabilities, and key size through the paring procedure. Through this information, phase 2 determines which key generation method to use.

Next, in the phase 2, legacy pairing or secure connection is performed between the server and the client at step S5040.

In the phase 2, 128 bits of temporary key and short term key (STK) are created to perform the legacy pairing.

Temporary key: A key created to generate STK
Short term key (STK): A key value used for establishing an encrypted connection between devices If a secure connection is performed in the phase 2, 128 bits of long term key (LTK) is created.

Long term key (LTK): A key value used not only for an encrypted connection between devices but also for a connection afterwards Next, in the phase 3, a key distribution procedure is performed between the server and the client at step S5050.

Through the procedure, a secure connection is established between the server and the client, and an encrypted link is formed to exchange data.

In what follows, a method for transmitting and receiving a long attribute value will be described.

The longest attribute which may be transmitted in a single packet is ATT_MTU-1 octet. In this case, ATT_MTU means the largest size of a packet transmitted between a client and a server.

At least, attribute opcode is included in an attribute PDU. The attribute value may be defined to be larger than the ATT_MTU-1 octet, and an attribute exhibiting this property is called a long attribute.

In order to read the whole value of an attribute longer than the ATT_MTU-1 octet, a read blob request message is used. By using the read blob request message, the first ATT_MTU-1 octet of a long attribute value may be read out.

In order to write the whole value of an attribute longer than the ATT_MTU-3 octet, a preparation write request message and execution write request message may be used. By using the write request message, the first ATT_MTU-3 octet of a long attribute value may be written.

It is difficult to determine whether an attribute value is longer than the ATT_MTU-3 octet which uses a specific protocol. The higher layer specification specifies that a given attribute may have the maximum length longer than the ATT_MTU-3 octet.

The maximum length of an attribute value is 512 octets. In other words, the longest length of data that may be stored in one characteristic is 512 octets.

Figure 6:
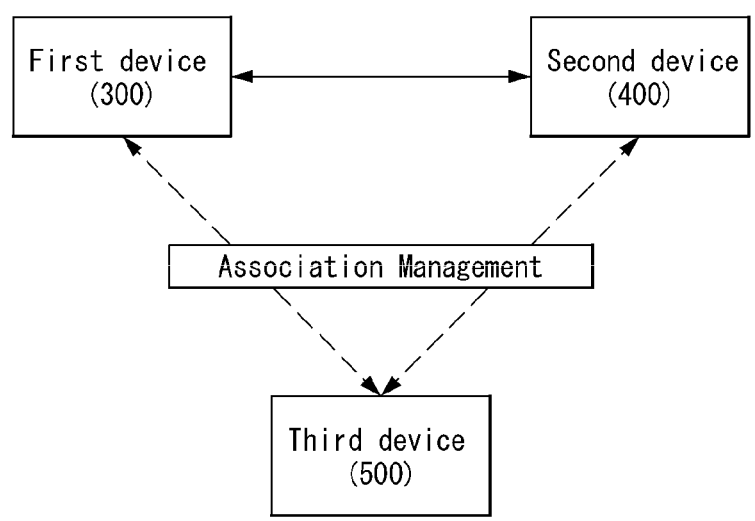
FIG. 6 illustrates a method for controlling a connection of other device through a control device proposed by the present specification.

FIG. 6 is a diagram in brief showing a method for controlling the connection of different devices through a control device, which is proposed in this specification.

As shown in FIG. 6, a third device 500 is necessary to control an operation between a first device 300 and a second device 400. The third device 500 requires a new control protocol in order to control the association of the first device 300 and the second device 400.

Hereinafter, a device for controlling the operation of the first device 300 and the second device 400 is called a control device, a controller, the third device 500, or a client.

Furthermore, a device controlled by a controller is called a first device, a second device or a server.

In this case, the client needs to be aware of information (e.g., association information, interface information, service information) of devices in order to control the operations of the devices.

Furthermore, if the client controls the operation of the servers by indicating a specific operation with respect to the servers, there is a problem in that the client cannot identify whether the indicated operation has been properly performed.

Furthermore, the client may control the operations of devices, but cannot set the execution time of an indicated operation. If an operation fails, there is a problem in that there is no method for specifically recognizing, by the client, a failed service and cause.

Accordingly, the present invention proposes a method for recognizing, by a client, information related to the association of servers, controlling the operation of the servers by indicating a specific operation and an execution time with respect to the servers, and transmitting an error code for identifying an operation not performed by a server and a failure cause if the server fails in the execution of the specific operation.

Figure 7:
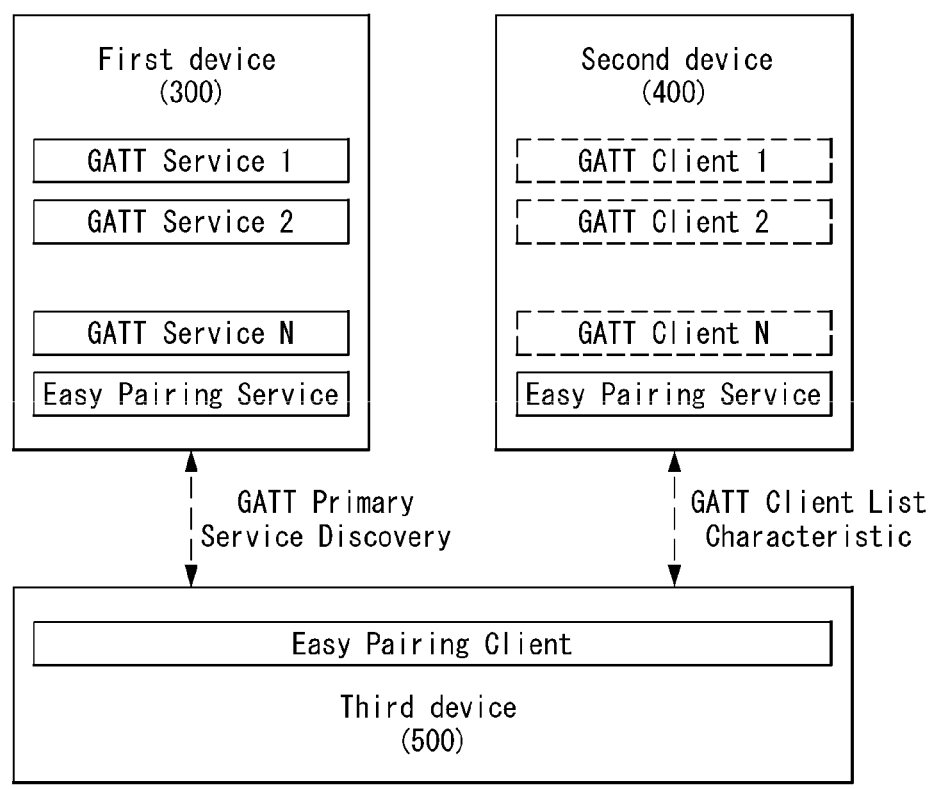
FIG. 7 illustrates one example of a profile structure for providing a service for controlling a device proposed by the present specification.

FIG. 7 is a diagram showing an example of a profile structure for providing a service for controlling a device, which is proposed in this specification.

In Bluetooth, a service capable of controlling and managing, by a specific device, the pairing and/or connection of another Bluetooth device is called an Easy Pairing Service. In FIG. 7, the controller 500 may control the pairing and/or connection of the first device 300 and the second device 400 using the Easy Pairing Service.

Referring to FIG. 7, the controller 500 may connect the first device 300 and the second device 400 through the Easy Pairing Service.

Specifically, after the controller 500 discovers the GATT Services of the first device 300 through a Primary Service Discovery procedure, the third device may discover the GATT Clients of the second device 400, that is, a peer device of the first device 300 along with a feature.

Accordingly, the controller 500 can be aware of GATT services available between the first device 300 and the second device 400.

The controller 500 may control the pairing and/or connection of the first device 300 and the second device 400 based on GATT services available between the first device 300 and the second device 400.

In such an Easy Pairing Service, the controller 500 may manage pairing and/or a connection based on that the first device 300 and the second device 400 form which association relation with which device.

Bluetooth is based on a 1 to 1 association, but one device may form an association relation with a plurality of devices through Bluetooth. That is, a 1 to many association may be possible.

Figure 8:
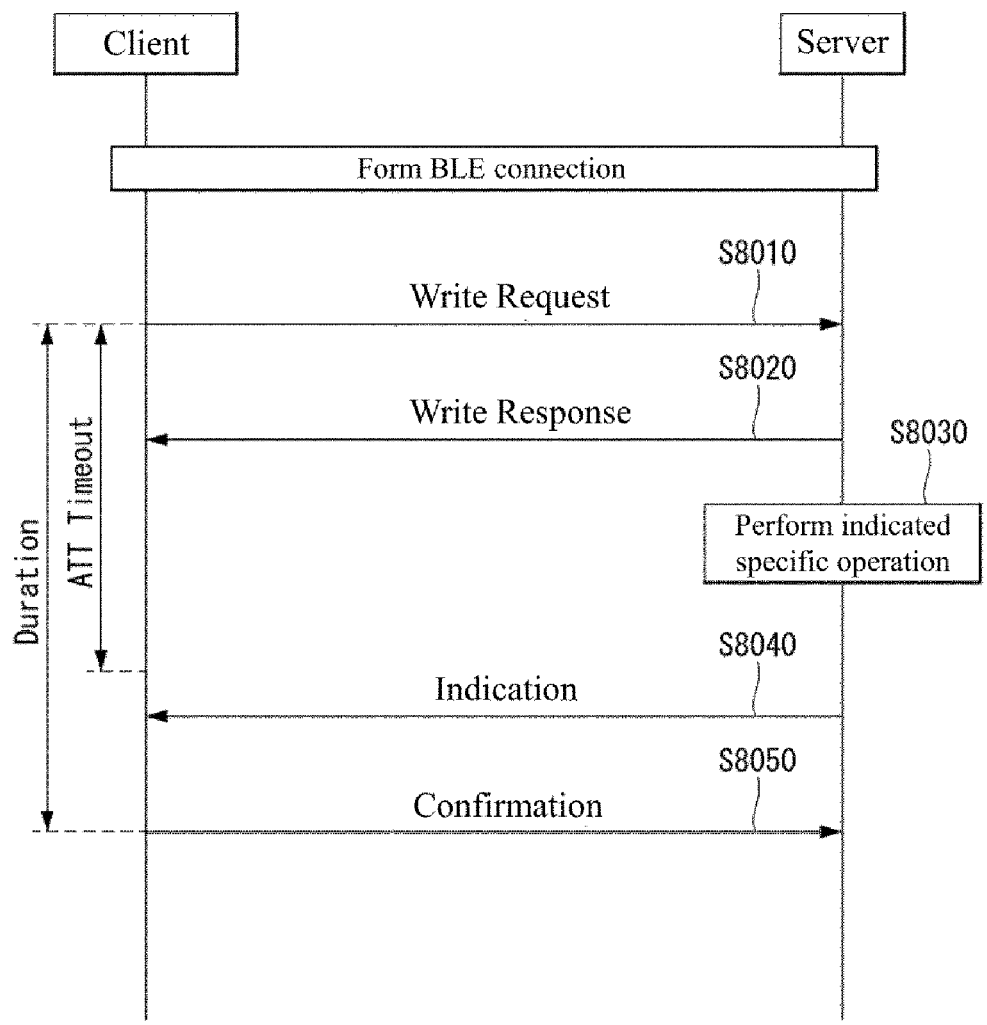
FIG. 8 is a flowchart illustrating an example of a method of controlling, by a client, a server, which is proposed in this specification.

FIG. 8 is a flowchart illustrating an example of a method of controlling, by a client, a server, which is proposed in this specification.

Referring to FIG. 8, the client may set the execution time of a specific operation while indicating the specific operation with respect to the server. The server may perform the indicated specific operation based on the set execution time.

Specifically, the client may form a Bluetooth LE connection with the server through the method described with reference to FIG. 5.

Thereafter, the client transmits, to the server, a write request message to request the writing of a control point feature by the server in order to indicate a specific operation with respect to the server (S8010).

The write request message may include an operation code (Opcode) indicative of a specific operation indicated by the client and an effective time related to the execution of the specific operation.

FIG. 9 shows an example of operation codes which may be indicated by a client with respect to a server.

The server needs to perform the indicated specific operation during an effective time or within effective time set by the client according to the operation.

For example, if an operation code included in the write request message is '0x04', that is, the indicated operation is a peripheral role for an LE connection, the server may transmit an advertising packet to peripheral devices during the effective time.

Alternatively, if an operation code included in the write request message is '0x06', that is, the indicated operation is an operation of selecting one of a plurality of banks indicative of the association relation of the server, the server may select one of specific banks within the effective time.

In this case, the bank means data split from association information set based on a maximum size if the configured association information exceeds a maximum size that may be stored in one feature.

The control point feature may be identified by a UUID, and may have a structure, such as Table 2.

TABLE 2

|  | Opcode | Parameters |
|---|---|---|
| Octet Order | None | LSO . . . MSO |
| Data Type | 8 bits | Variable |
| Size | 1 octet | 1 octet-X octets |
| Unit | None | None |

In Table 2, Opcode includes a code indicative of an indicated operation as shown in FIG. 9. Parameters include parameters related to an operation indicated by the Opcode.

Parameters may include information related to a specific operation indicated by Opcode. For example, Parameters may include an operation field indicative of operations that need to be performed in order to perform a specific operation indicated by Opcode, and an effective time field indicative of an execution time for which a specific operation needs to continue to be performed or an execution time for which a specific operation should be performed.

Furthermore, parameters may further include an additional field depending on an indicated operation.

When the server receives the write request message from the client, the server writes values received in the control point feature before an ATT timeout indicative of a response time expires, and transmits a write response message to the client as a response to the write request message (S8030).

In this case, if the server cannot write values, received through the write request message of the client, in the control point feature, it may transmit an error response message to the client before the ATT timeout expires.

After the server transmits the write response message to the client, it may perform the specific operation indicated by the client (S8030).

If the server cannot perform the operation indicated by the client, it may transmit an error message, including a response code indicative of an operation that cannot be performed and/or an error cause, shown in FIG. 10.

FIG. 10 shows an example of a response code.

The server may perform the indicated specific operation during the effective time or within the effective time written through the write request message, and may transmit, to the client, an indication message indicative of the successful execution of the specific operation (S8040).

In this case, the indication message may be transmitted from the server to the client before the effective time expires.

The client that has received the indication message indicative of the successful execution of the specific operation from the server transmits a confirmation message to the server as a response thereto (S8050).

Hereinafter, as a detailed embodiment of FIG. 8, the operation of a server for "Opcode" shown in FIG. 9 is described.

LE Peripheral Control Procedure Behavior

When a client recognizes that a server supports an LE Peripheral role through a read procedure, the client may indicate that the server should operate as the LE Peripheral role through the writing of the control point feature of the server.

Specifically, if Opcode of the control point feature of the server is written as "0x03" by the client, the server operates as an LE Peripheral of BR/EDR.

In this case, the Parameter of the control point feature of the server may be set like Table 3. The Operation field may be configured like Table 4.

TABLE 3

| | Operations | Effective Time | Peer Device ID | Peer Device IRK |
|---|---|---|---|---|
| Octet Order | LSO ... MSO | LSO ... MSO | LSO ... MSO | LSO ... MSO |
| Data Type | 24 bits | 16 bits | 48 bits | 128 bits |
| Size | 3 octets | 2 octets | 6 octets | 16 octets |
| Unit | None | None | None | None |

TABLE 4

| Bit | Definition of Operations |
|---|---|
| 0 | Server operates the Discoverable Mode.<br>0b: Limited Discoverable Mode<br>1b: General Discoverable Mode |
| 1 | Reserved for Future Use |

TABLE 4-continued

| Bit | Definition of Operations |
|---|---|
| 2 | Server shall operate the Connectable Mode.<br>0b: Directed Connectable Mode<br>1b: Undirected Connectable Mode |
| 3 | Reserved for Future Use |
| 4-5 | Server shall use the following address type for its Advertiser's Address.<br>00b: Public Device Address<br>01b: Static Device Address<br>10b: Non-Resolvable Private Address<br>11b: Resolvable Private Address |
| 6 | Reserved for Future Use |
| 7 | Server shall operate the Bondable Mode.<br>0b: Non-Bondable Mode<br>1b: Bondable Mode |
| 8 | Reserved for Future Use |
| 9 | Server shall indicate its Confirm Value to Client with Confirm Value Indication. |
| 10 | Server shall receive the Confirm Value of the peer Server via the Client with the Confirm Value Relay. |
| 11 | Reserved for Future Use |
| 12 | Peer Device IRK field is attached. |
| 13-23 | Reserved for Future Use |

Referring to Table 8, the server may be configured with a discoverable mode by the bit 0 of the operation field, and may be configured with a connectable mode by the bit 2 thereof.

For example, if the bit 2 of the operation field is set to "1b", the server may directly operate in a connectable mode using a value of a Peer Device ID field as the address of an initiator.

The server may advertise the type of its advertiser address as defined by the bit 4 and bit 5 of the operation field of Table 8.

If the server includes a Resolvable Private Address Only Characteristic, the server may also advertise its own Resolvable Private Address (RPA).

If a counterpart device does not have the IRK of a Resolvable Private Address, the counterpart device neglects advertising transmitted by the server.

The server may be configured with a bondable mode by the bit 7 of the operation field. If the server is not configured by the bit 7 of the operation field, it may be configured with a bondable mode by a higher layer spec. or according to an implementation.

In order for the bit 9 or 10 of the operation field to be set to "1b", the client needs to be connected to two servers, and the client has to exchange confirm values between one server and the other server.

A server generates a confirm value and a given value, and indicates that the client should relay, to the other server, values generated through a Confirm Value Indication Opcode.

When the bit 10 is set to "1b", the server waits to receive a Confirm Value Relay Opcode and a given value of the counterpart device from the client in order to form a security connection with the counterpart device.

When the bit 14 is set to "1b", the server receives a peer device IRK field, that is, an IRK value of the Peer Device ID field. The server adds a Peer Device ID, a Peer Device IRK, and a local IRK to a resolving list.

Hereinafter, operations related to an effective time and the success or failure of an operation may be the same as those described above.

LE Central Control Procedure Behavior

If a client recognizes that a server supports an LE Central role through a read procedure, the client may indicate that the server should operates as an LE Central role through the writing of a control point feature of the server.

Specifically, if Opcode of the control point feature of the server is written as "0x04" by the client, the server operates as an LE Central of BR/EDR.

In this case, Parameter of the control point feature of the server may be configured like Table 5. An Operation field may be configured like Table 6.

If a server supports a Resolvable Private Address, the server may receive a Peer Device IRK through a sub-procedure, such as Write Long Characteristic Values through which data having a long length can be transmitted and received.

TABLE 5

| | Operations | Effective Time | Peer Device ID | Peer Device IRK |
|---|---|---|---|---|
| Octet Order | LSO ... MSO | LSO ... MSO | LSO ... MSO | LSO ... MSO |
| Data Type | 16 bits | 16 bits | 48 bits | 128 bits |
| Size | 2 octets | 2 octets | 6 octets | 16 octets |
| Unit | None | None | None | None |

TABLE 6

| Bit | Definition of Operations |
|---|---|
| 0-1 | Server shall operate the Connection Establishment Procedure. 00b: Auto Connection Establishment Procedure 01b: General Connection Establishment Procedure 10b-11b: Reserved for Future Use |
| 2 | Reserved for Future Use |
| 3 | Server shall operate the Bonding Procedure. |
| 4 | Reserved for Future Use |
| 5 | Server shall indicate its Confirm Value to Client with Confirm Value Indication. |
| 6 | Server shall receive the Confirm Value of the peer Server via the Client with the Confirm Value Relay. |
| 7 | Reserved for Future Use |
| 8-9 | Server shall use the following address type for its Initiator Address. 00b: Public Device Address 01b: Static Device Address 10b: Non-Resolvable Private Address 11b: Resolvable Private Address |
| 10 | Reserved for Future Use |
| 11 | Peer Device IRK field is attached. |
| 12-15 | Reserved for Future Use |

The connection of a server may be formed according to a procedure configured by the bit 0 and 1 of the operation field. If the bit 3 is set to "1b", the server may perform a bonding procedure in order to store bonding information for a next connection with a counterpart device according to a pairing procedure.

If the bit 5 and the bit 6 of the operation field is set to "1b", a client may be connected to two servers. The client should exchange confirm values between one server and the other server.

If the bit 5 is set to "1b", a server generates a confirm value and a given value, and indicates that a client should relay, to another server, generated value through a Confirm Value
  Indication Opcode.

If the bit 10 is set to "1b", a server waits to receive a Confirm Value Relay Opcode and a given value of a counterpart device from a client in order to form a security connection with the counterpart device.

If the bit 14 is set to "1b", a server receives a peer device IRK field, that is, the IRK value of a Peer Device ID field.

The server adds a Peer Device ID, a Peer Device IRK, and a local IRK to a resolving list.

Hereinafter, operations related to an effective time and the success or failure of an operation may be the same as those described above.

Control Point Response Indication Opcode Behavior

A Control Point Response Indication Opcode may be used to indicate the success or failure of the above-described procedures. The response codes shown in FIGS. 7 and/or 8 may be used according to each procedure.

Table 7 shows an example of the parameters of the control point feature of a server if a Control Point Response Indication procedure is performed.

TABLE 7

| | Opcode of Requested Procedure | Response Code | Additional Parameter |
|---|---|---|---|
| Octet Order | LSO ... MSO | LSO ... MSO | LSO .... MSO |
| Data Type | 8 bits | 8 bits | Variable |
| Size | 1 octets | 1 octet | Variable |
| Unit | None | None | Dynamic |

An indication message, including a response code indicative of the results of the execution of the operation indicated or requested by a client may include an operation code indicative of the operation requested by the client as in Table 7.

If a server has successfully performed an operation requested by a client, it may use "0x00" indicative of the success of the operation as a response code. However, if a server fails in an operation requested by a client, it may select one response code indicative of the failure and failure cause of the operation among response codes shown in FIG. 10.

If an error condition occurs while a server performs a specific operation or specific procedure requested by a client, the server may stop operations related to the specific operation or specific procedure, may select a response code most related to an error among the response codes shown in FIG. 10, and may transmit the selected response code to the client.

If a server does not support an effective time set by a client, the server may transmit, to the client, its supported effective time along with a response code.

For example, if an effective time transmitted by a client is greater than a maximum operation time permitted in a server, the server may transmit, to the client, the maximum operation time supported by the server.

Furthermore, if an effective time transmitted by a client is smaller than a minimum operation time permitted in a server the server may transmit, to the client, a minimum operation time supported by the server.

A server cannot perform another operation until an operation indicated by a client is terminated.

Accordingly, if a specific operation and/or procedure is indicated by a different client while the server performs the operation indicated by the client, the server may transmit, to the different client, an error message including a response code indicating that the operation has not been completed.

In order to support a long range pairing/connection, LE Coded PHY(S=2, S=8) may be supported. Furthermore, in order to support high-speed transmission, an LE 2M PHY of 2 Mbps may be supported. In this case, the extension of the service feature of the Easy pairing service (EPS) is necessary.

Furthermore, periodic advertising may be supported for efficient advertising. In this case, an advertising extension for periodic advertising is necessary. For example, additional advertising PDUs need to be defined. Furthermore, a periodic advertising mode and procedure need to be added to a GAP. Meanwhile, due to backward compatibility, legacy advertising PDUs are used for primary advertising channels. In this case, a defined EPS operation may not be changed. However, an advertising extension may be influenced.

New PHY Types

As described above, for new requirements, such as a long range connection and high-speed transmission, new types of PHYs (e.g., 2M PHY, LE Coded PHY) may be provided. In this case, the preference of PHYs, such as 1M PHY, 2M PHY, and LE Coded PHY, may be selected by higher layer spec. That is, the preference of PHYs may be determined by a higher layer.

In general, EPS uses 1M PHY. Meanwhile, if a server has a preferred PHY, a client may trigger the operation of the server based on the preferred PHY. However, the client needs to identify the PHY of a different peer server.

For the newly added PHY features, a pairing supported feature needs to be extended. For example, the supported PHY bits of 2 bits indicative of a supported PHY may be added to the feature. In this case, the supported PHY bits may include a 2M PHY bit and an LE Coded PHY bit. For another example, the Preferred PHY bits of 2 bits indicative of a preferred PHY may be added to the feature. In this case, if a value of the preferred PHY bits is 00b, it may indicate that a preferred value is not present. Alternatively, if a value of the preferred PHY bits is 01b, it may indicate that a preferred PHY is 1M PHY. Alternatively, if a value of the preferred PHY bits is 10b, it may indicate that a preferred PHY is 2M PHY. Alternatively, if a value of the preferred PHY bits is 11b, it may indicate that a preferred PHY is LE Coded PHY. In this specification, the pairing supported features may also be called supported pairing features.

Furthermore, for the newly added PHY features, an LE Peripheral control point message and an LE Central control point message need to be extended. For example, the preferred PHY bits of 2 bits may be added within an operation field within the LE Peripheral control point message and the LE Central control point message. The preferred PHY bits are the same as that described above (No Preference (00b), 1M PHY (01b), 2M PHY (10b), LE Coded PHY (11b)).

New Advertising PDU

As described above, an advertising extension supporting newly defined advertising PDUs may be provided. The advertising extension can improve the performance of an advertising operation.

A Bluetooth device may perform advertising in a secondary advertising channel (that is originally a data channel) using a newly defined advertising PDU (e.g., AUX_EXT, AUX_ADV_IND, AUX_CONNECT_REQ, and AUX_CONNECT_RSP). In this case, a collision in a primary advertising channel (channel 37, 38, 39) can be avoided. The primary advertising channel becomes more congested due to a beacon, a mesh, etc., and may be vulnerable to interference from other radio technologies using a neighboring frequency. Accordingly, if advertising is performed in a secondary advertising channel using a new advertising PDU, the performance of an advertising operation can be improved because a collision in the primary advertising channel can be avoided.

For the new advertising method, the pairing supported feature needs to be extended. For example, supported PHY bits of a 1 bit indicative of a supported PHY may be added to the feature. In this case, the supported PHY bit may include an advertising extension bit.

Furthermore, for the new advertising method, the LE Peripheral control point message and the LE Central control point message need to be extended. For example, a preferred advertising bit of a 1 bit indicative of preferred advertising (advertising method) may be added to the message. In this case, if a value of the preferred advertising bit is 0b, this may indicate that preferred advertising is legacy advertising. That is, it may indicate that a preferred advertising method is a legacy advertising method of performing advertising in a primary advertising channel using the existing advertising PDU. Alternatively, if a value of the preferred advertising bit is 1b, it may indicate that preferred advertising is an advertising extension. That is, this may indicate that a preferred advertising method is an advertising extension method of performing advertising in a secondary advertising channel using a newly defined advertising PDU.

Periodic Advertising

As described above, an advertising extension supporting periodic advertising may be provided. To this end, a periodic advertising mode and procedure are added to the GAP. Meanwhile, EPS may control a GAP defined mode and procedure including the periodic advertising mode and procedure.

Periodic advertising is provided using a secondary advertising channel, and is an advertising method of periodically transmitting each packet at intervals that may be predictable from a previous one. In this case, streaming data can continue to be transmitted in the non-connection state although a primary advertising channel is congested due to a beacon.

The added operation is for broadcasted/multicasted data. Each mode and procedure is described below.

Periodic advertising synchronizablility mode: a mode for providing synchronization information on a periodic advertising event. In this specification, the periodic advertising synchronizablility mode may be abbreviated as an advertising synchronizablility mode or a synchronizablility mode.

Periodic advertising mode: a mode for transmitting advertising data at periodic and deterministic intervals.

Periodic advertising synchronization procedure: a procedure for receiving periodic advertising synchronization information and synchronizing periodic advertising. In this specification, the periodic advertising synchronization procedure may be abbreviated as a periodic advertising procedure.

For the new periodic advertising method, the pairing supported feature needs to be extended. For example, supported PHY bits of a 1 bit indicative of a supported PHY may be added to the feature. In this case, the supported PHY bit may include a periodic advertising mode bit and a periodic advertising synchronization establishment procedure bit. In this specification, the periodic advertising synchronization establishment procedure bit may also be called a periodic advertising synchronization procedure bit.

Furthermore, for the new periodic advertising method, a periodic advertising control point message needs to be newly defined. In an embodiment, the periodic advertising control point message may include an operation field, an IRK field and/or an Advertiser Address field. Each of the fields is described below.

The operation field is a field of a 1 byte and may indicate a periodic mode or periodic procedure. For example, if a value of the operation field is 0x01, a periodic mode may be indicated. If a value of the operation field is 0x02, a periodic procedure may be indicated. The IRK field may be a field of 16 octets. The advertiser address field is a field of 6 bytes. If a periodic procedure is selected, an advertiser address may be provided.

Extended Supported Pairing Features Feature

A Supported Pairing Features feature may be used to expose information of a controllable operation of a server for pairing and connection purposes. In an embodiment, the Supported Pairing Features feature may include a GAP operation field and an EP operation field.

The GAP operation field may identify common Bluetooth operations supported in a server. The common operations may be defined in the GAP. The EP operation field may identify an optional Easy pairing (EP) feature supported in a server. The optional EP operation may be defined in the EPS spec.

Such a Supported Pairing Features feature may be extended for periodic advertising.

Table 8 shows an example of the fields of an extended Supported Pairing Features feature.

TABLE 8

| Field | GAP Operations (modified) | EP Operations | Controller Operations (added) |
|---|---|---|---|
| Length | 3 bytes | 1 byte | 2 bytes |

Referring to Table 8, the extended Supported Pairing Features feature is characterized in that compared to the existing extended Supported Pairing Features feature, the GAP operation field is modified and a controller operation field is added.

Table 9 shows an example of bits added to the GAP operation field of the extended Supported Pairing Features feature.

TABLE 9

| Bit | Definition |
|---|---|
| 20 | The Periodic Advertising Mode (including Synchronizability Mode) is supported. |
| 21 | The Periodic Advertising Synchronization Establishment Procedure is supported |

Referring to Table 9, the GAP operation field may further include a bit 20 indicating that a periodic advertising mode (including synchronizability mode) is supported and a bit 21 indicating that a periodic advertising synchronization establishment procedure is supported.

Table 10 shows the controller operation field newly added to the extended Supported Pairing Features feature.

TABLE 10

| Bit | Definition |
|---|---|
| 0 | 2M PHY is supported |
| 1 | LE Coded PHY is supported |
| 2 | Advertising Extension is supported |
| 3-4 | Reserved for Future Use |
| 4-5 | The following Advertising is preferred (00b - No Preference, 01b - Legacy, 10b - Advertising Extension) |
| 6-7 | The following PHY is preferred (00b - No Preference, 01b - 1M PHY, 10b - 2M PHY, 11b - LE Coded PHY) |

Referring to Table 10, the controller operation field may include bits indicating controller operations. For example, the controller operation field may include a bit 0 indicating that 2M PHY is supported, a bit 1 indicating that LE Coded PHY is supported, a bit 2 indicating that an advertising extension is supported, bits 3-4 reserved for future use, bits 4-5 indicative of preferred advertising (advertising method), and bits 6-7 indicative of a preferred PHY.

In an embodiment, in the case of the bit indicative of preferred advertising (advertising method), when a value of the bit is 00b, it indicates that there is no preference. When a value of the bit is 01b, it indicates legacy. When a value of the bit is 10b, it indicates an advertising extension. In the case of the bit indicative of a preferred PHY, when a value of the bit is 00b, it indicates that there is no preference. When a value of the bit is 01b, it indicates that 1M PHY. When a value of the bit is 10b, it indicates that 2M PHY. When a value of the bit is 11b, it indicates that LE Coded PHY.

Extended Pairing Control Point Feature

Modified LE Peripheral Control Point Procedure

Table 11 shows a modified parameter of an LE Peripheral control point procedure. In this specification, the parameter of the LE Peripheral control point procedure may be abbreviated as an LE Peripheral control point parameter.

TABLE 11

| Field | Operation (modified) | Peer Device ID | Peer Device IRK |
|---|---|---|---|
| Length | 2 bytes | 6 byte | 16 bytes |

Referring to Table 11, the modified LE Peripheral control point parameter is characterized in that the operation field is modified, compared to the LE Peripheral control point parameter of Table 3. Although not shown, the modified LE Peripheral control point parameter may further include an effective time field. The modified LE Peripheral control point parameter is the same as the LE Peripheral control point parameter described with reference to Tables 3 and 4 except the modified portion.

Table 12 shows bits added to the operation field of the modified LE Peripheral control point parameter.

TABLE 12

| Bit | Definition |
|---|---|
| 13-14 | Operated PHYs (00b - Reserved for Future Use, 01b - 1M PHY, 10b - 2M PHY, 11b - LE Coded PHY) |
| 15 | Operated Advertising Operation (0b - Legacy Advertising, 1b - Advertising Extension) |

Referring to Table 12, compared to the operation field of Table 4, the modified operation field may further include bits 13-14 indicative of an operated PHY and a bit 15 indicative of an operated advertising operation. When a value of the bit indicative of the operated PHY is 00b, it may indicate that it is reserved for future use. When a value of the bit is 10b, it may indicate that the operated PHY is 1M PHY. When a value of the bit is 10b, it may indicate that the operated PHY is 2M PHY. When a value of the bit is 11 b, it may indicate that the operated PHY is LE Coded PHY. When a value of the bit indicative of the operated advertising operation is 0b, it indicates that the operated advertising operation is legacy advertising. When a value of the bit is 1b, it indicates that the operated advertising operation is an advertising extension.

Modified LE Central Control Point Procedure

Table 13 shows a modified parameter of the LE Central control point procedure. In this specification, the parameter of the LE Central control point procedure may be abbreviated as an LE Central control point parameter.

TABLE 13

| Field | Operation (modified) | Peer Device ID | Peer Device IRK |
|---|---|---|---|
| Length | 2 bytes | 6 byte | 16 bytes |

Referring to Table 13, the modified LE Central control point parameter is characterized in that the operation field is modified, compared to the LE Central control point parameter of FIG. 6. Although not shown, the modified LE Central control point parameter may further include an effective time field. The modified Central control point parameter is the same as the LE Peripheral control point parameter described with reference to Tables 5 and 6 except the modified portion.

Table 14 shows bits added to the operation field of the modified LE Central control point parameter.

TABLE 14

| Bit | Definition |
|---|---|
| 8-9 | Operated PHYs (00b - Reserved for Future Use, 01b - 1M PHY, 10b - 2M PHY, 11b - LE Coded PHY) |
| 10 | Operated Advertising Operation (0b - Legacy Advertising, 1b - Advertising Extension) |

Referring to Table 14, compared to the operation field of Table 6, the modified operation field may further include bits 8-9 indicative of an operated PHY and a bit 10 indicative of an operated advertising operation. When a value of the bit indicative of the operated PHY is 00b, it may indicate that the operated PHY is reserved for future use. When a value of the bit is 10b, it may indicate that the operated PHY is 1M PHY. When a value of the bit is 10b, it may indicate that the operated PHY is 2M PHY. When a value of the bit is 11b, it may indicate that the operated PHY is LE Coded PHY. When a value of the bit indicative of the operated advertising operation is 0b, it indicates that the operated advertising operation is legacy advertising. When a value of the bit is 1b, it indicates that the operated advertising operation is an advertising extension.

Newly Added Periodic Advertising Control Point Procedure

Table 15 shows the parameter structure of a periodic advertising control point procedure newly added to an extended Pairing Control Point. In this specification, the parameter of the periodic advertising control point procedure may be abbreviated as a periodic advertising control point parameter.

TABLE 15

| Field | Operation | Peer Device ID | Group ID or Key | Operation Duration |
|---|---|---|---|---|
| Length | 1 bytes | 6 byte | — | 2 bytes |

Referring to Table 15, the periodic advertising control point parameter may include an operation field, a peer device ID field, a group ID or a key field and/or an operation duration field.

Table 16 shows the operation field of the periodic advertising control point parameter.

TABLE 16

| Bit | Definition |
|---|---|
| 0-1 | 0x00 - Server shall operate the Periodic Advertising Mode (including Advertising Synchronizability Mode) without security. *Group ID field cannot be necessary 0x01 - Server shall operate the Periodic Advertising Mode (including Advertising Synchronizability Mode) with security. *Group ID field cannot be necessary 0x10 - Server shall operate the Periodic Advertising Synchronization Establishment Procedure without security *Group ID can be the Advertiser Address. 0x11 - Server shall operate the Periodic Advertising Synchronization Establishment Procedure with security. *Group ID can be hided like a private random address or Group Key can be distributed. |
| 2-7 | Reserved for Future Use |

Referring to Table 16, the operation field may include bit 0-1 indicating whether a server operates in a periodic advertising mode or whether a server operates in a periodic advertising synchronization establishment procedure.

In an embodiment, when the bit 0-1 is 0x00, it indicates that a server operates in the periodic advertising mode (including advertising synchronizability mode) without security. When the value is 0x01, it may indicate that a server operates in the periodic advertising mode (including advertising synchronizability mode) with security. When the value is 0x10, it indicates that a server operates according to a periodic advertising synchronization establishment procedure without security. When the value is 0x11, it indicates that a server operates according to a periodic advertising synchronization establishment procedure with security.

In this case, in the case of 0x00 and 0x01, the group ID field may not be necessary. Furthermore, in the case of 0x10, the group ID may be an advertiser address. Furthermore, in the case of 0x11, the group ID may be a private random address or the group key may be distributed. Meanwhile, if security is necessary, the group ID or key may be substituted with a peer device IRK of a 1:1 connection.

Figure 11:
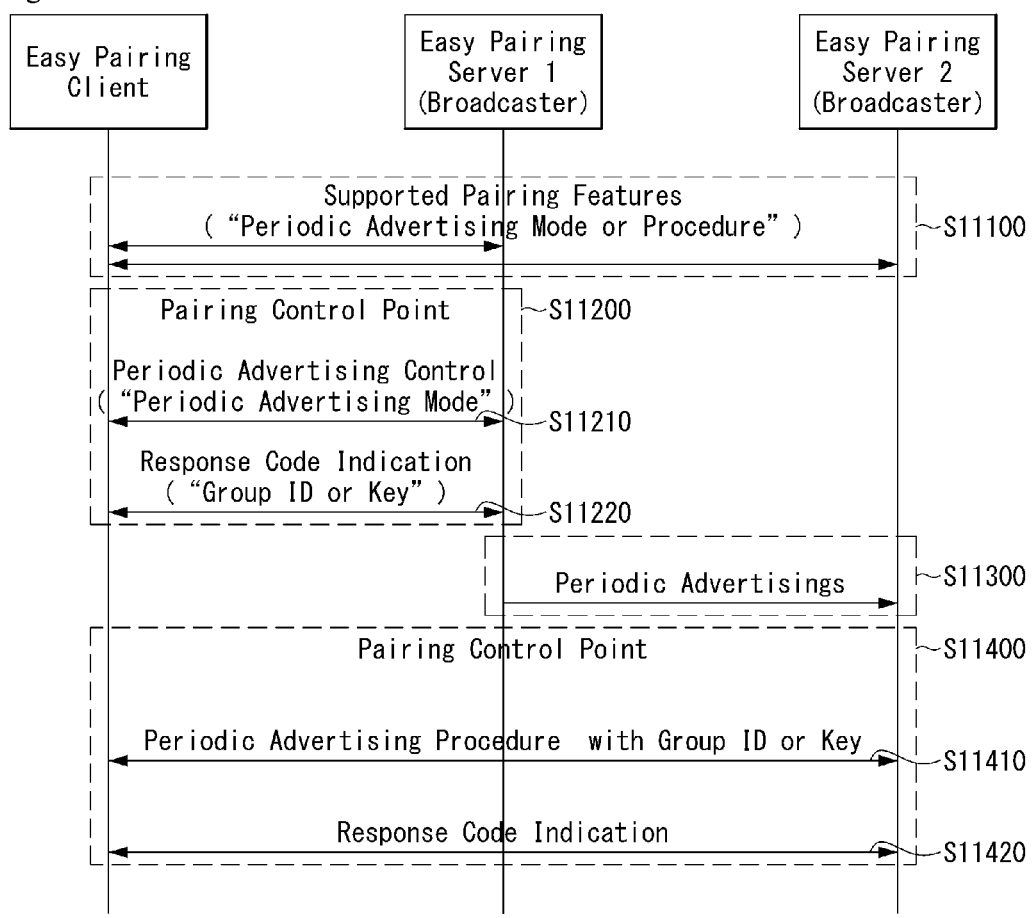
FIG. 11 shows an operational flow for periodic advertising according to an embodiment of the present invention.

FIG. 11 shows an operational flow for periodic advertising according to an embodiment of the present invention. Particularly, this drawing shows a method of performing, by a client, a Supported Pairing Features procedure and a Pairing Control Point procedure along with a server for periodic advertising. In FIG. 11, a description redundant with the description of FIGS. 1 to 10 is omitted. In the embodiment of FIG. 11, Bluetooth devices may be devices providing EPS. In this case, it is assumed that a server 1 operates as a broadcaster and a server 2 operates as an observer.

Referring to FIG. 11, first, the client may perform a Supported Pairing Features procedure along with the server 1 and the server 2 (S11100). To this end, the client may transmit a read request message to the server 1 and the server 2 in order to obtain information related to supported pairing features. The servers 1 and 2 may transmit read response messages to the client as responses.

In this case, the read response message may include information on a periodic advertising mode and/or a periodic advertising procedure. For example, the read response message may include information (bit) regarding whether a periodic advertising mode is supported and/or information (bit) regarding whether a periodic advertising procedure is supported. In an embodiment, the information (bit) regarding whether the periodic advertising mode is supported and the information (bit) regarding whether the periodic advertising procedure is supported may be included in the GAP operation field within the parameter of the read response message for the Supported Pairing Features procedure. This has been described with reference to Table 9. Accordingly, the client may check whether the servers 1 and 2 support the periodic advertising mode and/or the periodic advertising procedure.

Next, the client may perform a Pairing Control Point procedure along with the server 1 (S11200).

The client may perform a periodic advertising control procedure operation along with the server 1 (S11210). To this end, the client may transmit, to the server 1, a write request message to request the writing of a control point feature of the server in order to indicate a periodic advertising operation. In this case, the write request message may include information on the periodic advertising mode. For example, the write request message may include information (bit) indicating that the server should operate in the periodic advertising mode. In an embodiment, the information (bit) indicating that the server should operate in the periodic advertising mode may be included in the operation field within the parameter of the write request message for the periodic advertising control point procedure. Thereafter, the server 1 may transmit a write response message to the client as a response.

The client may perform a response code indication behavior (control point response indication Opcode operation) along with the server 1. To this end, the server 1 may transmit an indication message to the client. In this case, the indication message may include information regarding whether the server 1 has normally performed the periodic advertising operation (e.g., the writing of the periodic advertising mode) indicated by the client. Furthermore, the indication message may include information on a group key and ID. Thereafter, the client may transmit a confirmation message to the client as a response.

Next, the server 1 may perform a periodic advertising procedure for the server 2 (S11300).

Next, the client may perform a Pairing Control Point procedure along with the server 2 (S11400).

The client may perform a periodic advertising control procedure operation along with the server 2 (S11410). To this end, the client may transmit, to the server 2, a write request message to request the writing of a control point feature of the server in order to indicate a periodic advertising operation. In this case, the write request message may include information on the periodic advertising procedure. For example, the write request message may include information (bit) indicating that the server should operate according to the periodic advertising procedure. For example, the write request message may include information (bit) indicating that the server should operate according to the periodic advertising procedure having a group ID or key. In an embodiment, the information (bit) indicating that the server should operate according to the periodic advertising procedure may be included in the operation field within the parameter of the write request message for the periodic advertising control point procedure. Thereafter, the server 2 may transmit a write response message to the client as a response.

The client may perform a response code indication behavior (control point response indication Opcode operation) along with the server 2. To this end, the server 2 may transmit an indication message to the client. In this case, the indication message may include information indicating whether the server 2 has normally performed a periodic advertising operation (e.g., periodic advertising synchronization procedure) indicated by the client. Thereafter, the client may transmit a confirmation message to the client as a response.

Hereinafter, an association status feature is described.

As described above, Bluetooth is based on a 1 to 1 association, but a plurality of devices may form an association relation with one device through Bluetooth in the future. That is, a 1 to many association may be possible.

However, if the number of devices bonded, paired or connected to a server device is many, there is a problem in that the size of currently defined features cannot provide all pieces of association information of device.

For example, if a home network is configured, a plurality of devices may have been associated. If a server device has been associated with a plurality of sensors (e.g., a window sensor, a temperature sensor, an illuminance sensor and a humidity sensor), the server device cannot include all pieces of information, related to the associated devices, in one feature.

Furthermore, a method and message format for transmitting only changed association status information and/or related information to a control device if an association status between devices is changed have not been defined.

Accordingly, in order to solve such a problem, there is proposed a method of dividing specific information into plural information, alternately storing the divided information in one feature, and transmitting all the pieces of divided information to a client device.

Furthermore, there is proposed a method of transmitting only changed association status information and/or related information if some association status is changed.

Figure 12:
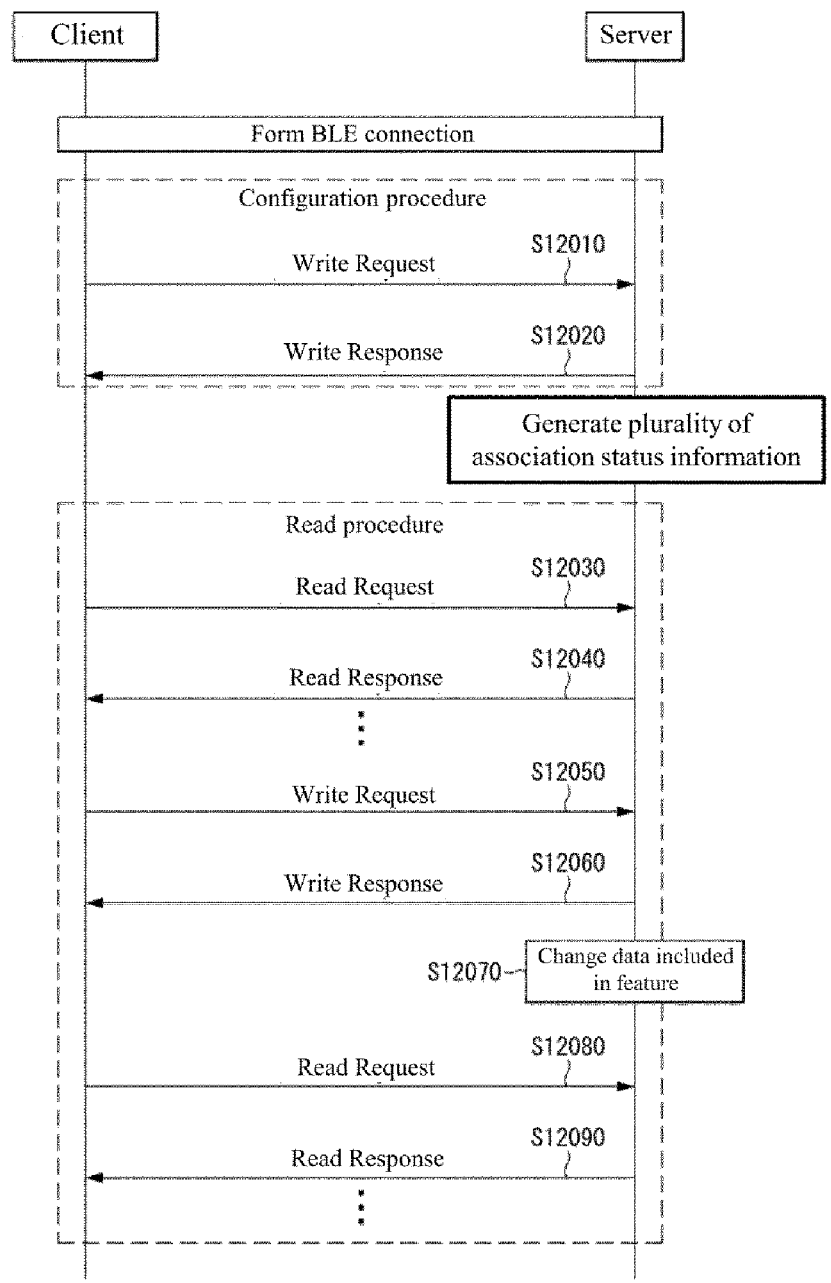
FIG. 12 is a flowchart showing an example of a method for transmitting/receiving association status information of a device and/or related information, which is proposed in this specification.

FIG. 12 is a flowchart showing an example of a method for transmitting/receiving association status information of a device and/or related information, which is proposed in this specification.

Referring to FIG. 12, if specific data exceeds a size that may be stored in one feature, a server may divide the specific data into a plurality of data and store the data in the feature.

Specifically, the client and the server may form a BLE connection through the above-described connection procedure.

After forming the BLE connection with the server, if association status information to be stored in the server and an association status are changed, the client performs a configuration procedure with the server in order to configure the indication behavior of the server for notifying the server of a changed association status.

The client transmits a write request message to request the writing of the server in a configuration feature for association status information and the configuration of the indication behavior (S12010).

The write request message includes configuration information for the configuration of the association status information. The configuration information may include association type information indicative of an association type, such as a connection, bonding or pairing, number information indicative of the number of association statuses to be stored, indicated association type information indicative of an association status to be transmitted to the client among changed association statuses, maximum number information indicative of a maximum number of association types to be transmitted through an indication message, and interval information indicative of the transmission interval of an indication message.

The server that has received the write request message from the client transmits a write response message to the client as a response thereto (S12020).

Thereafter, the server stores association status information and/or related information in the write request message received from the client, and may generate a plurality of data by dividing the stored association status information and/or related information based on the size of a feature.

Specifically, ① the server may configure association information to be stored in the feature among all association information. In the configuration of the association information, configuration information related to the configuration of the association information may be received from the client, or the server may directly configure the association information.

For example, when the server receives configuration information related to the configuration of association information among pieces of association information from the client, it configures association information by obtaining only connection information related to a connected device. Accordingly, the server device may configure association information by obtaining association information of all devices associated therewith, or may configure association information by obtaining association information including at least one of connection information, bonding information or pairing information.

If configured association information exceeds a maximum size that may be stored in one feature, the server may divide the configured association information into a plurality of data based on the maximum size. Hereinafter, each of the plurality of divided data is called a bank.

② Thereafter, the server selects the divided banks according to order and stores them in the feature. That is, the server selects the divided banks according to specific order and stores the selected bank in a related feature (hereinafter, association status feature).

The client may obtain the association information, stored in the server, through a read procedure.

Specifically, the client transmits, to the server, a request message to request the attribute value of the feature in which the association information has been stored (S12030).

In this case, if the attribute value stored in the feature is longer than ATT_MTU-1 octet, that is, the longest length of an attribute value that may be transmitted as a single packet, the client may read the first ATT_MTU-1 octet of the attribute value of the feature by transmitting a Read Blob Request message to the server.

When the server receives, from the client, a message to request the attribute value of the association status feature, it transmits the attribute value of the association status feature to the client through read response or read blob response messages (S12040).

Thereafter, the client may receive all attribute values stored in the feature by repeatedly performing S12030 and S12040 along with the server.

When the server transmits all the attribute values of the association status feature to the client, the server selects a next bank according to a specific order and updates (or replaces) the attribute value of the feature with the selected bank.

For example, the client transmits, to the server, a write request message to request the writing of a specific feature (e.g., control point feature) indicating the replacement of the attribute value of the feature from the client (S12050).

When the server receives the write request message from the client, it transmits a write response message to the client as a response thereto (S12060), and updates (or replaces) the attribute value of the association status feature with another bank (S12070).

In this case, the client may change the attribute value of the association status feature into a specific bank regardless of the order by transmitting the write request message including a value (e.g., a specific number of the order) indicative of a bank to be changed.

After changing the attribute value of the association status feature, the server may perform the same operations as S12030 and S12040 and transmit the updated attribute value of the feature to the client (S120120, S12090).

If there is data exceeding a maximum size that may be stored in one feature as described above, the data may be divided based on the maximum size and stored in the one feature. The divided data is alternately stored in the one feature according to a specific order. Accordingly, data exceeding a maximum size can be transmitted to a client through one feature.

Configuration for Association Status Indication

Hereinafter, a configuration for association status indication is described with reference to FIG. 13. This makes indication efficient by configuring a corresponding operation.

FIG. 13 is a diagram showing an example of a data format and feature for transmitting/receiving association status information having a large size and/or related information through a specific feature, which is proposed in this specification.

FIG. 13(a) shows an example of the header of a read blob response message for transmitting the attribute value of an association status feature and the header of a read response message or separate message for notifying a client that a server has configured which type of association information.

The definition of each field is as follows.

Association Status Info: this is a field providing summarized information of configured association status information, and includes the following information. This field may be repeated in each bank.

Completed List (CL) (1 bit): this indicates whether all pieces of association information have been divided.

Paired Device List (4 bit): this is information indicating whether information of a paired device has been included and an association status. The bits indicate LE Secure Connection Pairing, Authenticated MITM Protection, Unauthenticated no MITM protection, and No Security requirements.

Connected Device List (1 bit): this indicates whether information of a connected device has been included.

Bonded Device List (1 bit): this indicates whether information of a bonded device has been included.

Association Order (2 bits): this is information indicating order of divided association information, and may indicate the following order according to the bits.

No Order: there is no order
Recently Used: recently used order
Past Used: order used in the past
Frequently Used: frequently used order
Least Used: less used order
Bank Counter: the number of a bank now stored in an association status feature, and a maximum value of the Bank Counter is the same as that of Number of Bank.
Number of Bank: a total number of divided bank
Association Number: the number of associations of a currently selected bank (the number of associated devices based on a selected bank)

FIG. 13(b) shows an example of a write request message transmitted by a client and the configuration feature of a server in order to configure information to be stored in an association status feature. Meanwhile, for efficient association status indication, an association status configuration feature needs to be extended as in FIG. 13(b). This has advantages in that the number of features can be reduced and the time taken to configure two operations can be reduced. An association status configuration feature extended as described above may further include a flag field and an Indication Behavior Configuration.

The definition of each field of FIG. 13(b) is as follows.

Flag: a field providing next field information (e.g., when a value of the field is '0th bit', this indicates that a next field is a Reading Behavior Configuration field. When a value of the field is '1st bit', this indicates that a next field is an Indication Behavior Configuration.

Reading Behavior Configuration: this indicates the attribute value of a configuration information and feature for configuring a read procedure, and includes the following subfield (included in a configuration feature based on a value of the flag field)

Selected Association Type: this indicates the type of connection status information to be configured by a server (e.g., connection, bonding or pairing)

Association Number: this indicates the number of connection status information.

Indication Behavior Configuration: this indicates the attribute value if a configuration information and feature related to an indication procedure for transmitting changed association status information, and includes the following subfield (included in a configuration feature based on a value of the flag field).

Indicated Associated Type: a field similar to the Selected Association Type. The type of changed association status information to be transmitted through an indication message includes four pairing types (Secure connection, Authenticated, Unauthenticated, No security required), a connection and/or bonding. If a given bit is not selected, a server should not indicate anything. The first changed association information may be used to be first positioned.

Maximum Indicated Association Number: a maximum number of association status information which may be transmitted through an indication message. To determine this value as ATT_MTU is recommended in order to avoid longer attribute data. GATT permits a long attribute for indication, but a client should use "the Read Long Characteristic Values sub-procedure" after an indication message. If the number of changed association information is this value, a server should indicate the information before an interval value expires. If not, the server will delete the oldest information and add new information for indication.

Indicated Interval: a field including the transmission interval of an indication message. Basically, a server transmits changed association status information through an indication message for each interval. If a changed association status is not present, the server may transmit an indication message not including data. If the interval value is 0, the server needs to indicate when a given selected event has been generated without considering a maximum indicated association number.

Tables 17 and 18 show examples of transmission intervals which may be set.

TABLE 17

| Index | Natural Max | Allocated bits | Allocated Max |
|---|---|---|---|
| Month | 12 | 5 bits | 31 |
| Day/Mon. | 31 | 5 bits | 31 |
| Hour/Day | 24 | 5 bits | 31 |
| Min/Hour | 60 | 6 bits | 63 |
| Sec/Min | 60 | 6 bits | 63 |
| Total | | 27 bits (<4 bytes) | |

TABLE I8

| Unit flag 1byte | Time field 1byte |
|---|---|
| 0x00: No time Field | 0x00-0xFF(255) |
| 0x01: second | |
| 0x02: minute | |
| 0x03: hour | |
| 0x04: Day | |
| 0x05: Week | |
| 0x06: Month | |
| 0x07-0xFF: Reserved for Future Use | |

A detailed value of the transmission interval is determined in a higher layer, and may be longer than 1 second. In Table 18, the 0x00 value of a unit flag means that there is no indication interval.

Counting Reset

Hereinafter, a counting reset mechanism for initializing association order (e.g., the most frequently used, the least frequently used) is described.

A new control point message for such counting reset needs to be added. The message is for resetting counting an association use at a pairing control point. An exemplary message format is shown in Table 19.

TABLE 19

| Opcode 0x0B (may be changed) | Parameter Reset Time |
|---|---|
| 1byte | 2 bytes |

Operation

A time value may be a scheduled reset time for resetting a count.

If the time value is 0, a server will be reset when it receive a pairing control point.

Candidate Time Values

Local Time & reference time is not good: a device needs to be aware of time information (date and hour).

Reset Time: a server should reset a count value after a reset time within a received control point message.

Hereinafter, the reason why a reset timer is necessary is described with reference to FIG. 14.

Figure 14A:
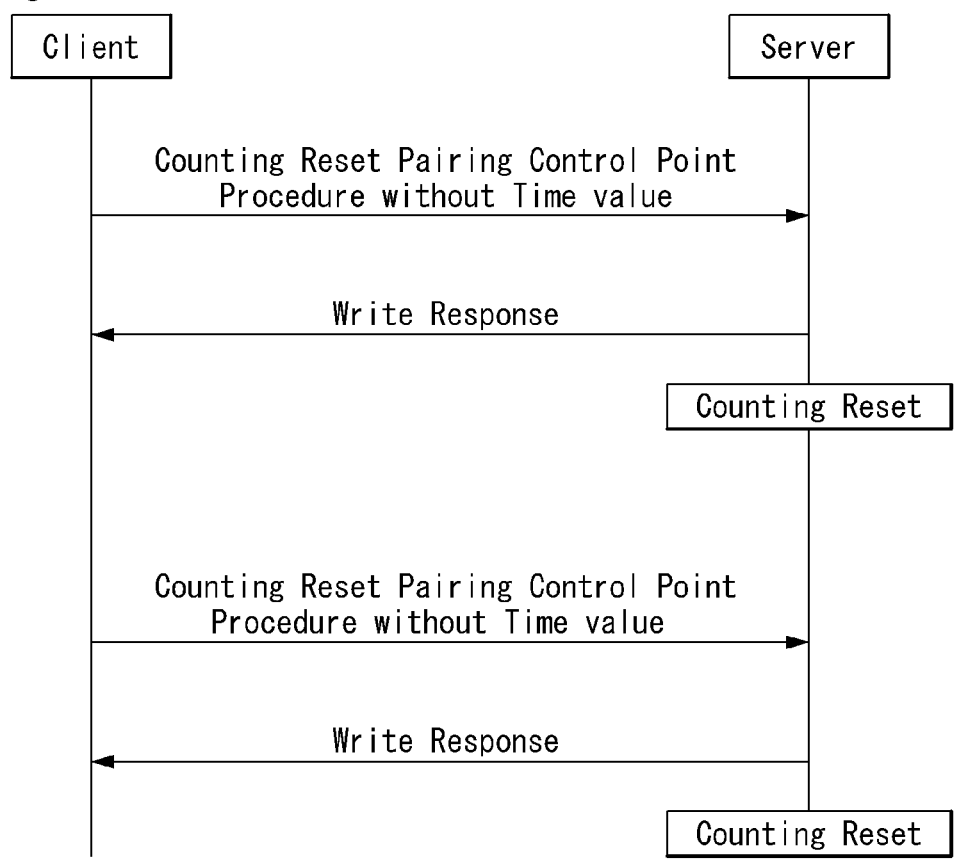
FIG. 14 shows a method of performing a pairing control point procedure for counting reset according to an embodiment of the present invention.
Figure 14B:
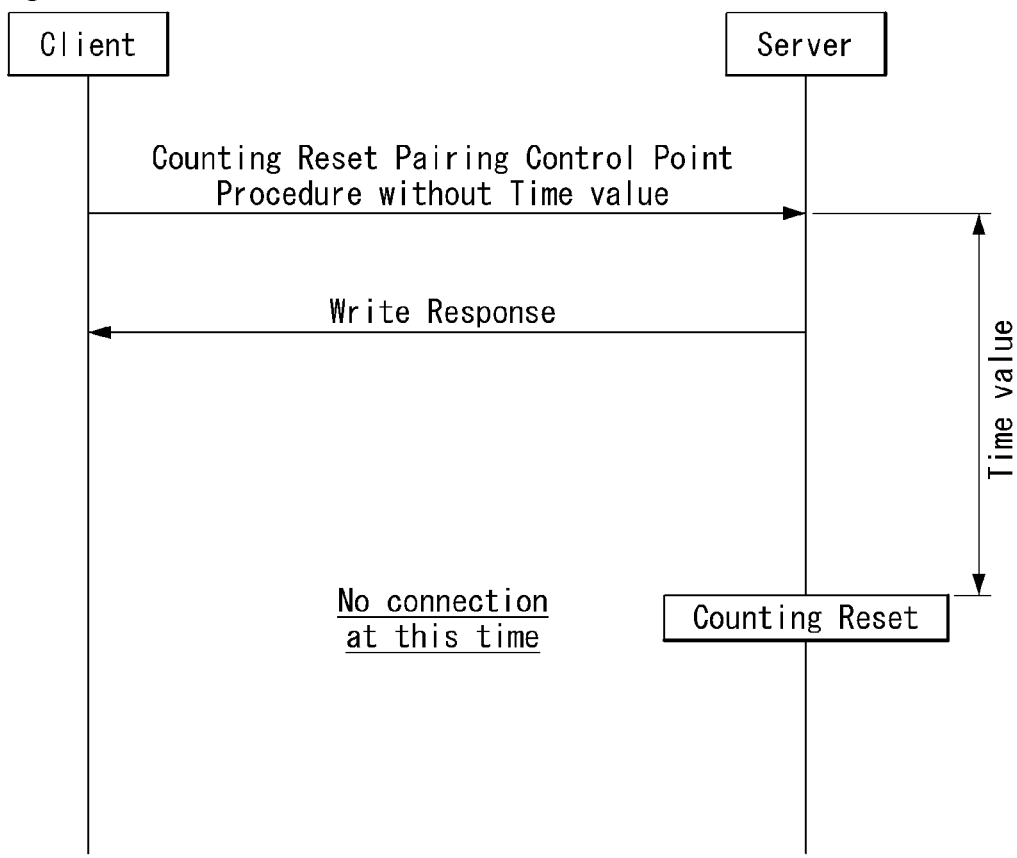

FIG. 14 shows a method of performing a pairing control point procedure for counting reset according to an embodiment of the present invention. Particularly, FIG. 14(a) shows a method of performing a pairing control point procedure for counting reset without a time value, and FIG. 14(b) shows a method of performing a pairing control point procedure for counting reset without a time value.

Referring to FIG. 14(a), if a pairing control point procedure for counting reset not having a time value is performed, that is, if a pairing control point procedure for counting reset is performed without a reset timer, a server should perform a counting reset operation as soon as it transmits a write response message. Accordingly, the EPS can be managed inefficiently because a counting reset procedure is performed regardless of whether a pairing control point procedure is performed within a given time.

Referring to FIG. 14(b), if a pairing control point procedure for counting reset having a time value is performed, that is, if a pairing control point procedure for counting reset having a reset timer is performed, a server may reset a count value after a reset time within a received control point message. This enables a counting reset operation to be efficiently performed. That is, the EPS can be managed efficiently because a counting reset operation is performed only when a connection is present for given duration.

Value Difference Between Reading & Indication

Figure 15:
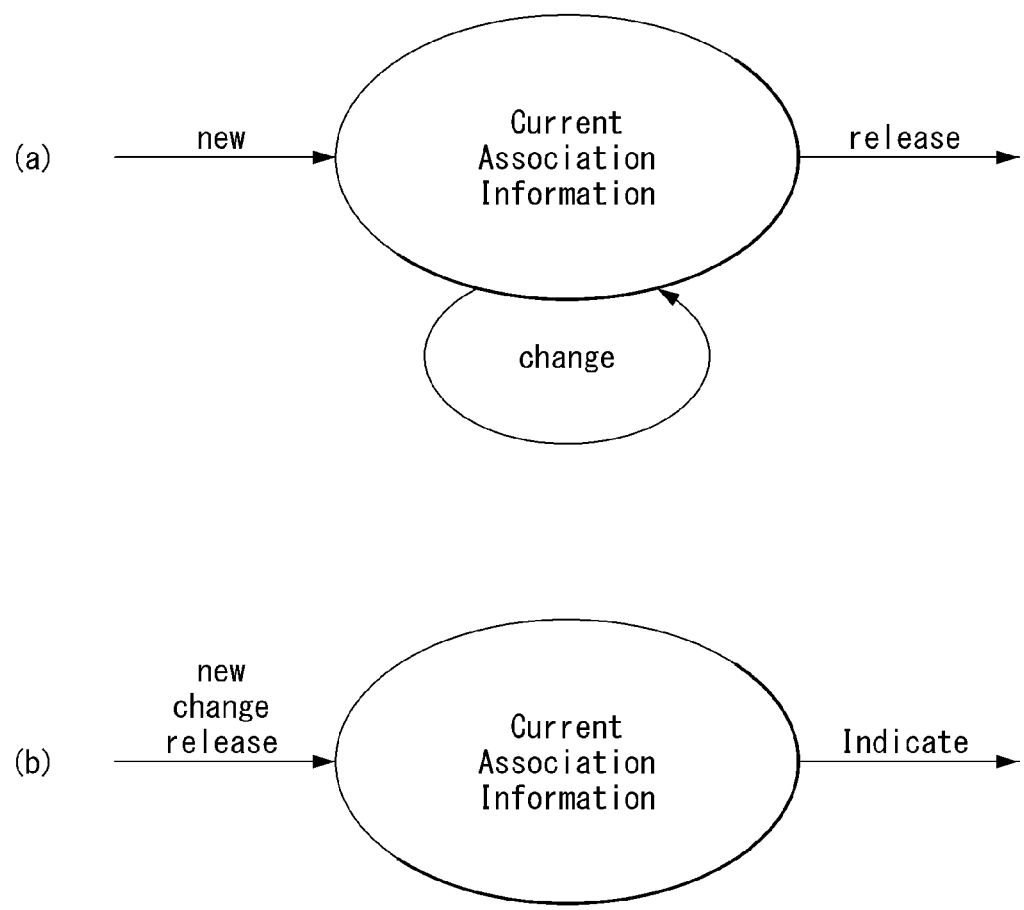
FIG. 15 shows a value of an association status feature for a read procedure and an indication procedure according to an embodiment of the present invention.

FIG. 15 shows a value of an association status feature for a read procedure and an indication procedure according to an embodiment of the present invention.

Hereinafter, a feature value between a read procedure and an indication procedure is described with reference to FIG. 15. One association status feature needs to have two different values for this purpose. For example, an association status feature should have a value for a read procedure having current association information and a value for an indication procedure having changed association information.

Hereinafter, a value for a read procedure having current association information is described with reference to FIG. 15(a), and a value for an indication procedure having changed association information is described with reference to FIG. 15(b).

The Value for Reading Procedure with Current Association Information

Information is added if a new association is generated.
Information is updated if an association is changed.
Information is removed if an association is released without bonding information.

The Value for Indication Procedure with Changed Association Information

Information is added if current association information is changed (added, updated or removed).
Information is removed if changed association information is indicated.

As described above, there is a problem in that one association status feature has to have two different values for a read procedure and an indication procedure. In order to solve this, an additional association information feature needs to be newly defined for indication.

This feature may be an optional feature. If a server wants to indicate changed information, the server should support this feature. If not, the server may not support this feature.

This operation depends on a value of an association status configuration feature. Particularly, this operation is dependent on an indicated association type, a maximum indicated association number, and an indication behavior configuration field including an indicated interval.

Figure 16:
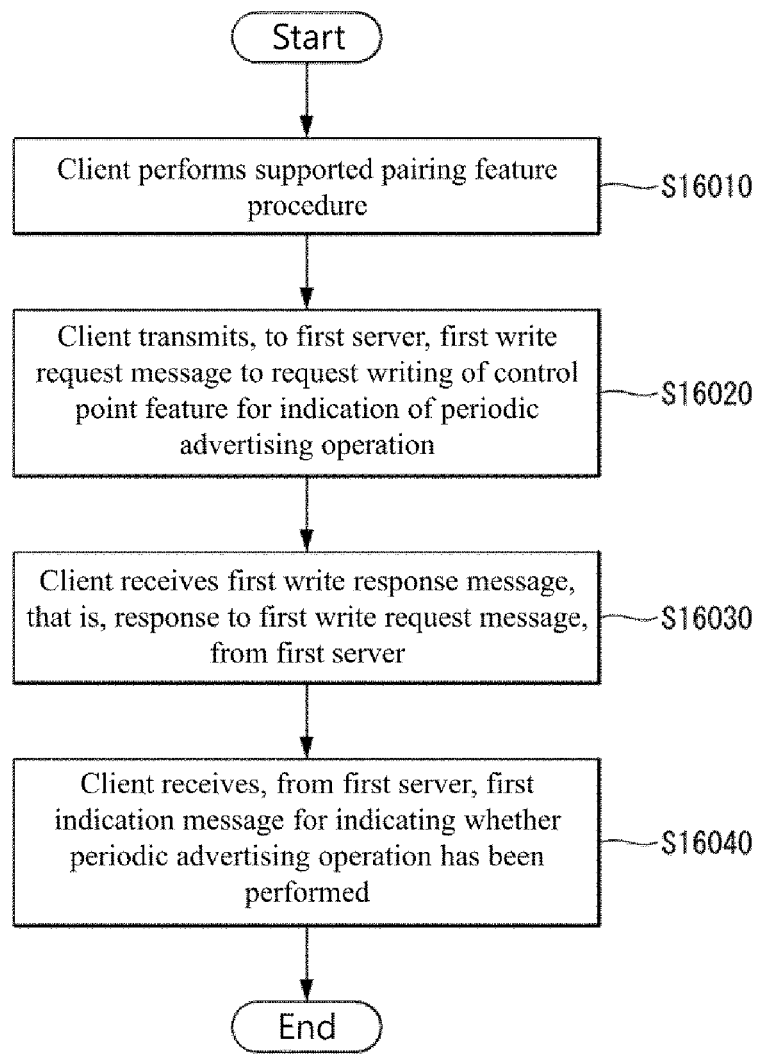
FIG. 16 is a flowchart of a Bluetooth communication method for periodic advertising according to an embodiment of the present invention.

FIG. 16 is a flowchart of a Bluetooth communication method for periodic advertising according to an embodiment of the present invention. In FIG. 16, a description redundant with the description of FIGS. 1 to 15 is omitted.

First, a client may perform a supported pairing feature procedure (S16010). For example, the client may perform the supported pairing feature procedure along with a first server and a second server. In this case, the supported pairing feature procedure may be used for the client to obtain supported feature information indicating an operation supported by a server.

In an embodiment, the supported feature information may include periodic advertising operation-related information. The supported feature information may be information that corresponds to or is included in the periodic advertising control point feature. In an embodiment, the periodic advertising operation-related information may include at least one of periodic advertising mode information indicating that a periodic advertising mode is supported or periodic advertising synchronization procedure information indicating that a periodic advertising synchronization establishment procedure is supported.

The client may transmit, to a first server, a first write request message to request the writing of a control point feature for the indication of a periodic advertising operation (S16020). In an embodiment, the first write request message may correspond to the LE Peripheral control point feature or may be included therein. Alternatively, the first write request message may correspond to the LE Central control point feature or may be included therein.

The client may receive a first write response message, that is, a response to the first write request message, from the first server (S16030).

The client may receive, from the first server, a first indication message for indicating whether the periodic advertising operation has been performed (S16040).

In an embodiment, the first write request message may include periodic advertising information indicating that the server should perform the periodic advertising mode or the periodic advertising synchronization establishment procedure. For example, if a value of the periodic advertising information is a first value, the periodic advertising information may indicate that the first server should perform the periodic advertising mode without security. If a value of the periodic advertising information is a second value, the periodic advertising information may indicate that the first server should perform the periodic advertising mode with security. If a value of the periodic advertising information is a third value, the periodic advertising information may indicate that the first server should perform the periodic advertising synchronization establishment procedure without security. If a value of the periodic advertising information is a fourth value, the periodic advertising information may indicate that the first server should perform the periodic advertising synchronization establishment procedure with security.

In an embodiment, the first indication message may include group ID information or group key information for the periodic advertising operation.

In an embodiment, a Bluetooth communication method for periodic advertising may further include the steps of transmitting, by a client, a second write request message to request the writing of a control point feature for the indication of a periodic advertising operation to a second server, receiving, by the client, a second write response message that is a response to the second write request message from the second server, and receiving, by the client, a second indication message for indicating whether the periodic advertising operation performed by the first server is successful from the second server.

In an embodiment, the supported feature information may include at least one of information indicating that 2M PHY is supported, information indicating that LE Coded PHY is supported, information indicating that an advertising extension is supported, information indicating a preferred advertising or information indicating a preferred PHY. In an embodiment, the information indicating preferred advertising may indicate any one of legacy advertising or advertising extension as preferred advertising. The information indicating preferred PHY may indicate any one of 2M PHY or LE Coded PHY as preferred PHY.

Although the drawings have been divided and described for convenience of description, the embodiments described with reference to the drawings may be merged to implement a new embodiment. Furthermore, to design a computer-readable recoding medium on which a program for executing the above-described embodiments has been recorded according to the needs of a person having ordinary skill in the art falls within the scope of the present invention.

The method according to this specification are not limitedly applied to the elements and methods according to the above-described embodiments, and some of or all the above-described embodiments may be selectively combined and configured so that the embodiments are modified in various manners.

Meanwhile, the method of this specification may be implemented in a processor-readable recording medium included in a network device, in the form of processor-readable code. The processor-readable recording medium includes all types of recording devices in which data readable by a processor is stored. The processor-readable recording medium may include ROM, RAM, CD-ROM, magnetic tapes, floppy disks, and optical data storage devices, for example. Furthermore, the processor-readable recording medium may be implemented in the form of carrier waves, such as transmission through the Internet. Furthermore, the processor-readable recording medium may be distributed to computer systems connected over a network, and the processor-readable code may be stored and executed in a distributed manner.

Furthermore, although the preferred embodiments of this specification have been illustrated and described above, this specification is not limited to the above-described specific embodiments, and a person having ordinary skill in the art to which the present invention pertains may modify this specification in various ways without departing from the gist of the present invention in the present invention. Such modified embodiments should not be individually understood from the technical spirit or prospect of the present invention.

Furthermore, in this specification, both the apparatus invention and the method invention have been described, but the descriptions of both the inventions may be complementally applied, if necessary.

INDUSTRIAL APPLICABILITY

The data transmission and reception method of the present invention has been illustrated as being basically applied to Bluetooth LE, but may be applied to various wireless communication systems in addition to the Bluetooth LE system.

The invention claimed is:

1. A Bluetooth communication method, comprising:
performing, by a client, a supported pairing feature procedure, wherein the supported pairing feature procedure is used for the client to obtain supported feature information indicating an operation supported by a server, and the supported feature information comprising periodic advertising operation-related information;
transmitting, by the client, a first write request message to request a writing of a control point feature for an indication of a periodic advertising operation to a first server;
receiving, by the client, a first write response message which is a response to the first write request message from the first server; and
receiving, by the client, a first indication message for indicating whether the periodic advertising operation has been performed from the first server,
wherein the periodic advertising operation-related information comprises at least one of periodic advertising mode information indicating that a periodic advertising mode is supported or periodic advertising synchronization procedure information indicating that a periodic advertising synchronization establishment procedure is supported.

2. The method of claim 1,
wherein the first write request message comprises periodic advertising information indicating that the server needs to perform the periodic advertising mode or the periodic advertising synchronization establishment procedure.

3. The method of claim 2,
wherein if a value of the periodic advertising information is a first value, the periodic advertising information indicates that the first server needs to perform a periodic advertising mode without security,
wherein if a value of the periodic advertising information is a second value, the periodic advertising information indicates that the first server needs to perform a periodic advertising mode with security,
wherein if a value of the periodic advertising information is a third value, the periodic advertising information indicates that the first server needs to perform a periodic advertising synchronization establishment procedure without security, and
wherein if a value of the periodic advertising information is a fourth value, the periodic advertising information indicates that the first server needs to perform a periodic advertising synchronization establishment procedure with security.

4. The method of claim 1,
wherein the first indication message comprises group ID information or group key information for the periodic advertising operation.

5. The method of claim 1, further comprising:
transmitting, by the client, a second write request message to request a writing of a control point feature for an indication of a periodic advertising operation to a second server;
receiving, by the client, a second write response message which is a response to the second write request message from the second server; and
receiving, by the client, a second indication message for indicating whether the periodic advertising operation performed by the first server is successful from the second server.

6. The method of claim 1,
wherein the supported feature information comprises at least one of information indicating that 2M PHY is supported, information indicating that LE Coded PHY is supported, information indicating that an advertising extension is supported, information indicating preferred advertising, or information indicating a preferred PHY.

7. The method of claim 6,
wherein the information indicating preferred advertising indicates any one of legacy advertising or the advertising extension as preferred advertising, and wherein the information indicating a preferred PHY indicates any one of the 2M PHY or the LE Coded PHY as a preferred PHY.

8. A Bluetooth communication device, comprising
a communication unit for communicating with an outside in a wireless or wired manner;
a memory for storing data; and
a processor functionally connected to the communication unit,
wherein the processor is configured to:
perform a supported pairing feature procedure, wherein the supported pairing feature procedure is used to obtain supported feature information indicating an operation supported by a server, and the supported feature information comprising periodic advertising operation-related information;
transmit, to a first server, a first write request message to request a writing of a control point feature for an indication of a periodic advertising operation;
receive, from the first server, a first write response message which is a response to the first write request message; and
receive, from the first server, a first indication message for indicating whether the periodic advertising operation has been performed,
wherein the periodic advertising operation-related information comprises at least one of periodic advertising mode information indicating that a periodic advertising mode is supported or periodic advertising synchronization procedure information indicating that a periodic advertising synchronization establishment procedure is supported.

9. The Bluetooth communication device of claim 8,
wherein the first write request message comprises periodic advertising information indicating that the server needs to perform the periodic advertising mode or the periodic advertising synchronization establishment procedure.

10. The Bluetooth communication device of claim 9,
wherein if a value of the periodic advertising information is a first value, the periodic advertising information indicates that the first server needs to perform a periodic advertising mode without security,
wherein if a value of the periodic advertising information is a second value, the periodic advertising information indicates that the first server needs to perform a periodic advertising mode with security,
wherein if a value of the periodic advertising information is a third value, the periodic advertising information indicates that the first server needs to perform a periodic advertising synchronization establishment procedure without security, and
wherein if a value of the periodic advertising information is a fourth value, the periodic advertising information indicates that the first server needs to perform a periodic advertising synchronization establishment procedure with security.

11. The Bluetooth communication device of claim 8,
wherein the first indication message comprises group ID information or group key information for the periodic advertising operation.

12. The Bluetooth communication device of claim 8,
wherein the processor is configured to:
transmit, by the client, a second write request message to request a writing of a control point feature for an indication of a periodic advertising operation to a second server;
receive, by the client, a second write response message which is a response to the second write request message from the second server; and
receive, by the client, a second indication message for indicating whether the periodic advertising operation performed by the first server is successful from the second server.

13. The Bluetooth communication device of claim 8,
wherein the supported feature information comprises at least one of information indicating that 2M PHY is supported, information indicating that LE Coded PHY is supported, information indicating that an advertising extension is supported, information indicating preferred advertising, or information indicating a preferred PHY.

14. The Bluetooth communication device of claim 8,
wherein the information indicating preferred advertising indicates any one of legacy advertising or the advertising extension as preferred advertising, and
wherein the information indicating a preferred PHY indicates any one of the 2M PHY or the LE Coded PHY as a preferred PHY.

* * * * *